US011162333B2

(12) United States Patent
Bertani et al.

(10) Patent No.: US 11,162,333 B2
(45) Date of Patent: Nov. 2, 2021

(54) CONTAMINANT EXTRACTION IN A BOREHOLE

(71) Applicant: Romolo L. Bertani, Sydney (AU)

(72) Inventors: Romolo Lorenzo Bertani, Sydney (AU); Amir Moezzi, Sydney (AU)

(73) Assignee: Romolo Lorenzo Bertani, Sydney (AU)

( * ) Notice: Subject to any disclaimer, the term of this patent is extended or adjusted under 35 U.S.C. 154(b) by 45 days.

(21) Appl. No.: 16/607,052

(22) PCT Filed: Apr. 19, 2018

(86) PCT No.: PCT/AU2018/050353
§ 371 (c)(1),
(2) Date: Oct. 21, 2019

(87) PCT Pub. No.: WO2018/191783
PCT Pub. Date: Oct. 25, 2018

(65) Prior Publication Data
US 2020/0063534 A1    Feb. 27, 2020

(30) Foreign Application Priority Data
Apr. 19, 2017   (AU) ............................... 2017901425

(51) Int. Cl.
*E21B 43/08*   (2006.01)
*B01D 24/00*   (2006.01)
(Continued)

(52) U.S. Cl.
CPC .......... *E21B 43/086* (2013.01); *B01D 24/008* (2013.01); *B01D 24/042* (2013.01);
(Continued)

(58) Field of Classification Search
CPC ...... E21B 17/1057; E21B 33/10; E21B 34/08; E21B 43/02; E21B 43/08; E21B 43/086;
(Continued)

(56) References Cited

U.S. PATENT DOCUMENTS 4,553,429 A  * 11/1985  Evans ..................... E21B 21/08
73/152.21
5,050,679 A  *  9/1991  George ................. E21B 33/138
166/285

(Continued)

FOREIGN PATENT DOCUMENTS

WO   WO 2015/012821 A1    1/2015
WO   WO 2015/176139 A1   11/2015

OTHER PUBLICATIONS

Bertani, Romolo Lorenzo, International Search Report and Written Opinion, PCT/AU2018/050353, dated Jun. 28, 2018, 14 pgs.

*Primary Examiner* — D. Andrews
*Assistant Examiner* — Ronald R Runyan
(74) *Attorney, Agent, or Firm* — Morgan, Lewis & Bockius LLP

(57) ABSTRACT

The present invention relates to a system for contaminant extraction in a borehole extending from a surface of the Earth through a water permeable layer and into an underlying production zone, the system comprising: an outer casing located within the borehole and extending through the water permeable layer; a production pipe located within the casing and extending towards the production zone; a filter assembly occupying at least part of an intermediate zone between the outer casing and the production pipe, wherein the filter assembly is configured to capture contaminants before they enter the water permeable layer and/or before they are released into the atmosphere, the filter assembly comprising: a lower solids filtering stage configured to filter solid contaminants; and an upper fluids filtering (Continued)

stage configured to filter fluid contaminants migrating from the production zone through the lower solids filtering stage; and sealing means for preventing the uncontrolled leakage of contaminants from the intermediate zone. Methods for contaminant extraction, a contaminant filtration system and solid and fluid filter modules are also disclosed.

19 Claims, 34 Drawing Sheets

(51) Int. Cl.
| | |
|---|---|
| *B01D 24/04* | (2006.01) |
| *B01D 24/08* | (2006.01) |
| *B01D 24/16* | (2006.01) |
| *B01D 36/00* | (2006.01) |
| *E21B 43/38* | (2006.01) |

(52) U.S. Cl.
CPC ............ *B01D 24/08* (2013.01); *B01D 24/165* (2013.01); *B01D 36/001* (2013.01); *E21B 43/38* (2013.01); *B01D 2101/02* (2013.01)

(58) Field of Classification Search
CPC .......... E21B 43/10; E21B 43/26; E21B 43/38; B01D 24/008; B01D 24/042; B01D 24/08; B01D 24/165; B01D 36/001
See application file for complete search history.

(56) References Cited

U.S. PATENT DOCUMENTS

| | | | |
|---|---|---|---|
| 5,673,752 | A | 10/1997 | Scudder et al. |
| 7,048,048 | B2 | 5/2006 | Nguyen et al. |
| 10,267,125 | B2 * | 4/2019 | Bertani ................ E21B 47/10 |
| 2012/0211226 | A1 | 8/2012 | Guest et al. |
| 2016/0032693 | A1 * | 2/2016 | Lehrling ............... E21B 43/088 |
| | | | 166/387 |

* cited by examiner

CONTAMINANT EXTRACTION IN A BOREHOLE

CROSS REFERENCE TO RELATED APPLICATIONS

This Application is a United States National Stage Application filed under 35 U.S.C. § 371 of PCT Patent Application Serial No. PCT/AU2018/050353 filed on Apr. 19, 2018, which claims the benefit of and priority to Australian Patent Application No. 2017901425 filed on Apr. 19, 2017, each of which is hereby incorporated by reference in its entirety.

FIELD OF THE INVENTION

The present disclosure relates to contaminant extraction in a borehole.

BACKGROUND OF THE INVENTION

During drilling and completion of a borehole (also referred to as a wellbore), casing is inserted into the borehole and cement is usually placed in the annulus between the casing and the surrounding rock of the borehole. This borehole may be used to extract hydrocarbon resources from a production zone or to perform hydraulic fracturing (fracking) within the production zone that involves injecting a fracturing fluid, which contains water mixed with sand and other chemicals, at high pressure into a shale formation containing shale gas.

In some instances, the cement may not adhere to certain types of rock and may deteriorate over time, causing gaps to form on the outside of the casing, such as between the rock and the casing or the casing and the cement. Further, this cement may fail over time, for example, as a result of structural or chemical failure. It is also difficult or impossible to fix these leaks as they occur below the surface and on the outside of the casing. It is also possible that the casing or the joins between the casing may fail over time resulting in leaks through the casing.

During fracking or hydrocarbon extraction activities, contaminants may escape from the production zone and travel along the wellbore through the gaps created in the cement and migrate into a water permeable layer, potentially contaminating water supplies. Greenhouse gases, such as methane or carbon dioxide, may also escape from the production zone over time and migrate through these gaps, ultimately being released into the atmosphere.

It is desirable to reduce or minimise contamination of a water permeable layer. It is also desirable to capture these stray greenhouse gases to reduce or minimise the amount of greenhouse gases released into the atmosphere from the wellbore.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

According to one aspect of the invention, there is provided a system for contaminant extraction in a borehole extending from a surface of the Earth through a water permeable layer and into an underlying production zone, the system comprising:

an outer casing located within the borehole and extending through the water permeable layer;

a production pipe located within the casing and extending towards the production zone;

a filter assembly, at least part of which occupies at least part of an intermediate zone between the outer casing and the production pipe, wherein the filter assembly is configured to capture contaminants before they enter the water permeable layer and/or before they are released into the atmosphere, the filter assembly comprising:

a lower solids filtering stage configured to filter solid contaminants; and an upper fluids filtering stage configured to filter fluid contaminants migrating from the production zone through the lower solids filtering stage;

lowering and raising means for lowering and raising the filter assembly which occupies the intermediate zone; and sealing means for preventing the uncontrolled leakage of contaminants from the intermediate zone.

The solids filtering stage may comprise a perforated housing arrangement and the fluids filtering stage comprises a non-perforated housing arrangement, the perforated housing arrangement comprising a series of perforated filter modules engaged with one another and configured to filter solid contaminants and permit entry of fluid contaminants migrating from the production zone into the upper fluids filtering stage of the filter assembly.

The upper fluids filtering stage may be located in the intermediate zone within the borehole and comprises a series of filter modules having non-perforated exterior sidewalls sealingly engaged in fluid communication with one another.

The upper fluids filtering stage may be located externally of the borehole and is in fluid communication with the intermediate zone via the sealing means for receiving and filtering fluid contaminants, the upper fluids filtering stage including a series of fluid contaminant filter modules.

Each borehole-based filter module may comprises at least two parts having interior voids, each part being configured to be assembled around the production pipe, and in combination defining a plurality of channels therebetween for receiving a plurality of cables for lowering and removing the filter assembly from the borehole, and a central channel for receiving the production pipe. The at least two parts may include semi-annular halves, and mounting means for retrofitting the halves together around the production pipe and cables.

The lowering and raising means may include a surface based winding assembly, a plurality of cables extending from the winding assembly and support means for supporting the filter assembly on the cables for enabling raising and lowering of the filter assembly within the borehole using the winding assembly. The support means may include a support cradle located beneath the filter assembly and connected to the cables.

The plurality of channels of each module may be configured to inter-engage directly and independently with the cables for lowering and removing the filter assembly from the borehole.

Each fluid contaminant filter module may include chemical or physical filter media selected from a group including zeolite or activated carbon.

Each solids contaminant filter module may include a physical filter medium including zeolite.

The filter assembly may include a plurality of alignment rollers configured to bear rotatably against the outer casing for facilitating raising and lowering of the filter assembly within the borehole.

A filter bag may also be provided within the perforated modules for containing physical and/or chemical filter media Each of the non-perforated modules may also comprises an intervening apertured wall located at an uppermost portion and a lowermost portion of the housing for retaining physical and/or chemical filter media within the module.

A funnel may be located below the filter assembly, wherein the funnel is provided to channel gases and/or fluids migrating from the production zone towards the filter assembly.

According to a second aspect of the invention, there is provided a contaminant filtration system for contaminant extraction in a borehole installation including a borehole extending from a surface of the Earth through a water permeable layer and into an underlying production zone, an outer casing cemented within the borehole and extending through the water permeable layer, and a production pipe located within the casing and extending towards the production zone, the filtration system including:

a filter assembly occupying at least part of an intermediate zone between the outer casing and the production pipe, wherein the filter assembly is configured to capture contaminants before they enter the water permeable layer and/or before they are released into the atmosphere, the filter assembly comprising:

a lower solids filtering stage configured to filter solid contaminant; and an upper fluids filtering stage configured to filter fluid contaminants migrating from the production zone through the lower solids filtering stage, wherein at least the lower solids filtering stage comprises at least one filter module including a pair of opposing semi-annular cylindrical halves each having interior voids, and configured to be mounted together around the production pipe;

lowering and raising means for lowering and raising the at least one filter module; and pump means communicating with the intermediate zone via a gas pipeline for extracting filtered gas through the filter assembly.

The upper fluids filtering stage may comprise at least one filter module including a pair of opposing semi-annular cylindrical halves each having interior voids, and configured to be mounted together around the production pipe above the at least one lower solids filter module.

According to a third aspect of the invention, there is provided a method for contaminant extraction in a borehole extending from a surface of the Earth through a water permeable layer and into an underlying production zone, the borehole including an outer casing cemented within the borehole and extending through the water permeable layer, and a production pipe within the casing and extending towards the production zone, the method including;

providing a filter assembly, at least part of which occupies at least part of an intermediate zone between the outer casing and the production pipe, to capture contaminants before they enter the water permeable layer or before they are released into the atmosphere, the filter assembly including a lower solids filtering stage configured to filter solid contaminants, including at least one solids filtering module; and an upper fluids filtering stage configured to filter fluid contaminants migrating from the production zone through the lower solids filtering stage and including at least one fluid filtering module;

fitting the at least one solids filtering module between the outer casing and the production pipe;

lowering the at least one solids filtering module down the borehole on a plurality of cables towards the production zone;

sealing the intermediate zone above the filtering assembly to prevent the uncontrolled leakage of contaminants from the intermediate zone; and extracting filtered gas though the filter assembly for into an overlying collection zone for further collection and processing.

Fitting the at least one fluids filtering module may occur between the outer casing and the production pipe above the solids filtering module and lowering the at least one fluids filtering module down the borehole on the plurality of cables.

A funnel may also be deployed below the filter assembly before lowering the filter assembly, wherein the funnel is provided to channel gases and/or fluids migrating from the production zone towards the filter assembly.

Each filter module may comprise a pair of opposing semi-annular halves, each having interior voids for receiving chemical and/or physical filter media, and configured to be mounted together, the halves defining a plurality of channels therebetween for receiving a plurality of cables for lowering and removing the filter assembly from the borehole.

A support cradle may be mounted to the ends of the cables, the support cradle configured to enable the lifting and lowering of the filter assembly from the borehole using at least one surface-based winding assembly.

The filter assembly may be lowered by clamping the halves of the lowermost filter module together around the cables at the surface, lowering the assembled lowermost filter module down the borehole to allow the halves of an overlying filter module to be clamped together at the surface and engaged with the underlying module, and continuing with subsequent overlying modules until completion of the assembly.

The method may further include sensing in order to determine when the filter assembly requires replacing, removing the sealing means, raising the used filter modules via the cables, replacing the used modules, fitting replenished modules around the cables and production pipe, lowering the replenished modules into position, and replacing the sealing means.

According to a fourth aspect of the invention, there is provided a method for contaminant extraction in a borehole extending from a surface of the Earth through a water permeable layer and into an underlying production zone, the borehole including an outer casing cemented within the borehole and extending through the water permeable layer, the method including;

coupling a filter assembly to a lowering and raising assembly for lowering and raising a filter assembly within the outer casing, the filter assembly configured to capture contaminants before they enter the water permeable layer or before they are released into the atmosphere, the filter assembly including a lower solids filtering stage configured to filter solid contaminants, including at least one solids filtering module having a central channel; and an upper fluids filtering stage configured to filter fluid contaminants migrating from the production zone through the lower solids filtering stage and including at least one fluid filtering module having a central channel;

lowering the at least one solids filtering module down the borehole on a plurality of cables towards the production zone;

inserting a seal having a central channel above the filter assembly to prevent the uncontrolled leakage of contaminants from the borehole; and inserting a production pipe through the central channel of the seal, the central channel of the at least one solids filtering module and the central channel of the at least one fluid filtering module;

extracting filtered gas though the filter assembly and seal into an overlying collection zone for further collection and processing.

According to a fifth aspect of the invention, there is provided a solids filter module for filtering solid contaminants in a borehole installation including a borehole extending from a surface of the Earth through a water permeable layer and into an underlying production zone, an outer casing cemented within the borehole and extending through the water permeable layer, and a production pipe located within the casing and extending towards the production zone, the solids filter module being configured for location in an intermediate zone between the production pipe and the casing, and including:

a pair of opposing semi-annular cylindrical halves, each having interior voids for receiving chemical and/or physical filter media, apertured outer side, top and bottom walls and mounting means for enabling the halves to be mounted together, the halves defining a plurality of channels therebetween for receiving a plurality of cables for lowering and removing the filter module from the borehole, and a central semi-cylindrical recess for receiving the production pipe.

According to a sixth aspect of the invention, there is provided a fluid filter module for filtering fluid contaminants in a borehole installation including a borehole extending from a surface of the Earth through a water permeable layer and into an underlying production zone, an outer casing cemented within the borehole and extending through the water permeable layer, and a production pipe located within the casing and extending towards the production zone, the solids filter module being configured for location in an intermediate zone between the production pipe and the casing, and including:

a pair of opposing semi-annular cylindrical halves, each having interior voids for receiving chemical and/or physical filter media, non-apertured outer and inner side walls and apertured top and bottom walls, and mounting means for enabling the halves to be mounted together, the halves defining a plurality of channels therebetween for receiving a plurality of cables for lowering and removing the filter module from the borehole, and a central cylindrical recess for receiving the production pipe.

The filter modules may also include upper and lower sealing formations for enabling the modules to be stacked on top of one another in sealing engagement, the halves further defining channels for receiving monitoring instrumentation for monitoring the state of the filter modules.

The filter modules may further include a plurality of equispaced alignment rollers configured to facilitate upwards and downwards travel of the filter module against the inner wall of the casing.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Overview

Figure 1A:
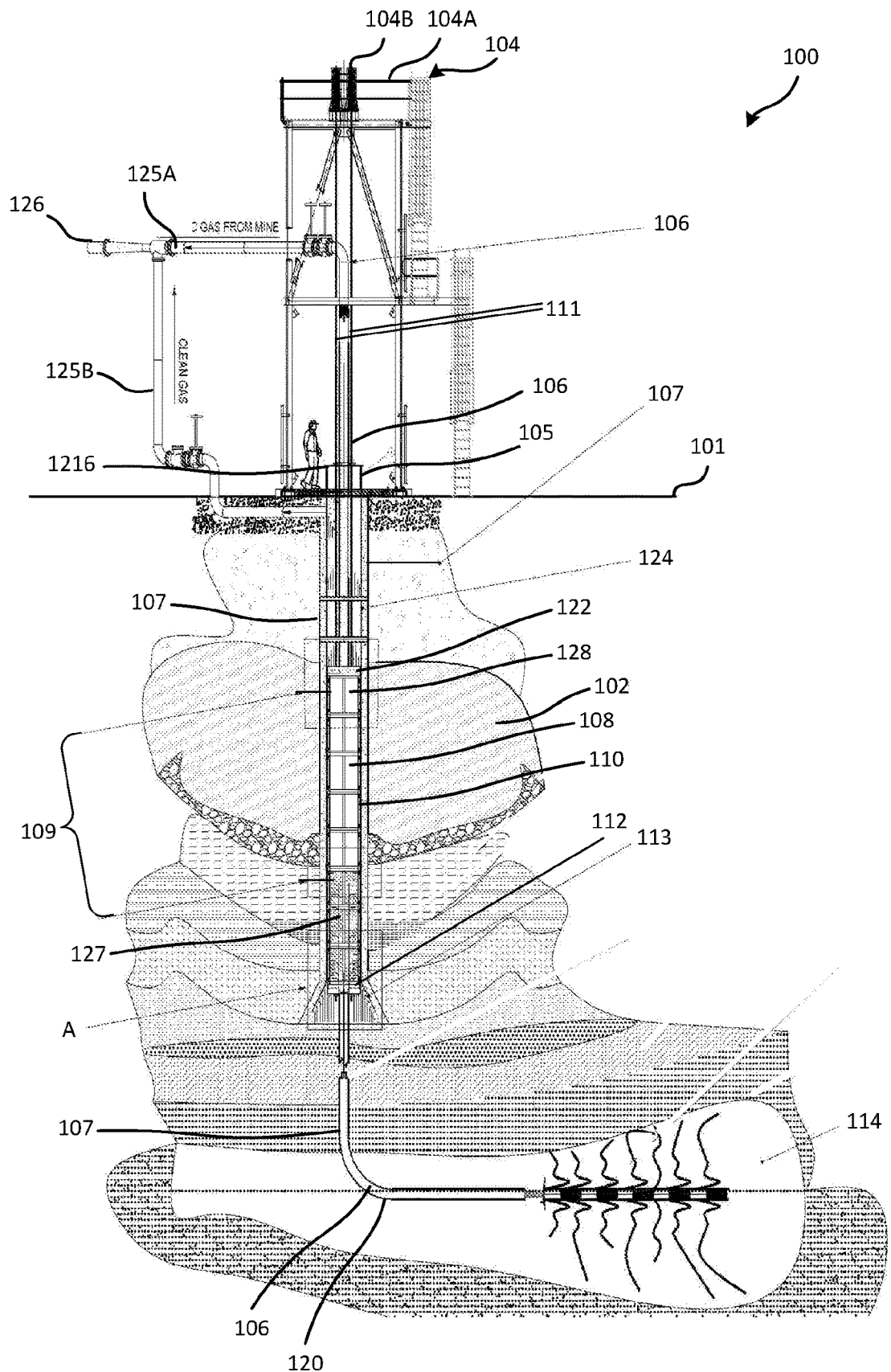
FIG. 1A is a sectioned perspective view of a first embodiment of a system for contaminant extraction in a borehole.

FIG. 1A shows a first embodiment of a system 100 for contaminant extraction in a borehole 107 within an underground formation 150. The underground formation 150 includes a water permeable layer 102 overlying a production zone 114. In one example, the production zone 114 may include a hydrocarbon reservoir or a geothermal reservoir. Above the surface 101, the system 100 includes a well head 104 from which an outer casing 105 and an inner production casing 106 extend into a borehole 107 that passes through the water permeable layer 102 and towards the production zone 114. In another embodiment, a plurality of inner production casings 106 may extend through the outer casing 105 into a plurality of boreholes 107.

In order to secure the casing 105 to the rock wall of the bore hole 107, cement 120 may also be provided in the annulus surrounding the outer casing 105 and the borehole 107.

FIG. 1A shows a first embodiment of a filter assembly 108 in the form of a plurality of filter modules 109 coupled end to end, within the borehole 107 in an intermediate zone 110 located between the production casing 106 and the outer casing 105. The filter assembly 108 comprises a lower filtering stage including a plurality of perforated filter modules 127 for filtering solid contaminants and an upper filtering stage including a plurality of non-perforated filter modules 128 for filtering liquid and in particular gaseous contaminants. These filter modules 109 may be lowered into place within the outer casing 105 via a pair of cables 111 and a support cradle assembly 112 using a surface-based winding assembly comprising an overhead gantry 104A carrying a motor operated cable drum arrangement 1048. A funnel 113 extends from the lowermost portion of the outer casing 105 below the lowermost filter module 109 in order to direct contaminants into the filter assembly 108.

The filter modules 109 are designed to capture fluid or gaseous contaminants that may have leaked from the production zone 114. For example, gaseous contaminants may include one or more of: hydrogen sulphide, methyl mercaptan and heavy elements leaking from the production zone 114 that migrate upwards around a portion of the borehole 107 located below filter assembly 108 and ultimately towards the well head 104 and surface 101.

The filter modules 109 are also configured to perform in-situ purification of natural gas including methane, ethane, and carbon dioxide before these gases reach the surface 101. Therefore, an underground separation process occurs within the filter modules 109 to separate the unwanted and toxic impurities from the leaked fluid and/or gas and to let the purified and desirable portion of the gas to be transmitted into an overlying collection zone 124 for collection and further processing. In one example, the purified gases obtained from the collection zone 124 can be added to the gases obtained from the production zone 114 to increase the yield of production which would have otherwise been lost to the atmosphere and/or within the underground formation 150.

The filter modules 109 may also alleviate issues with sealing the production casing 106 and the surrounding rock wall of the borehole 107 in the regions around the boundary of the production zone 114, whereby a poor seal may result in fluid (e.g. fracking fluids, geothermal fluids or hydrocarbons) or gaseous contaminants leaking from the production zone 114 along or around the production casing 106.

The filter assembly 108 also captures contaminants that may have leaked within or around the portion of the borehole 107 located below the filter assembly 108. Such leakage may include instances where the outer casing 105, the production casing 106, the cement 120 or rock wall of the borehole 107 located below the filter assembly 108 have deteriorated or failed causing a leak of contaminants.

In the illustrated embodiment of FIG. 1A part of the filter assembly 108 is located below the water permeable layer 102. This configuration may reduce or minimise contamination of the water permeable layer 102 and possible resultant contamination of water supplies.

The filter assembly 108 also reduces or minimises the release of gaseous contaminants into the atmosphere by capturing these contaminants before they are released at the surface 101 and into the atmosphere.

Figure 1B:
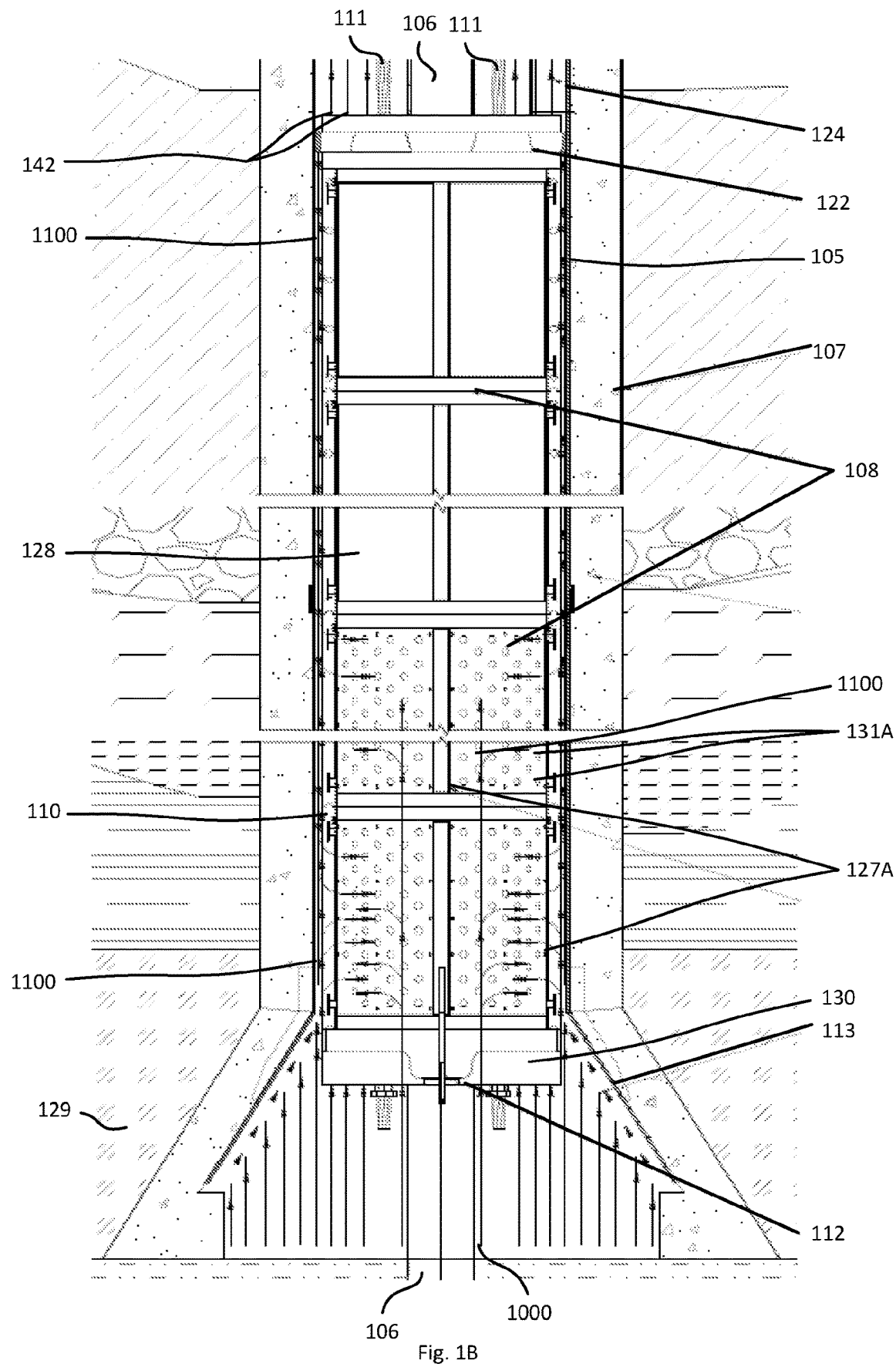
FIG. 1B is an enlarged view of Inset A of FIG. 1A and shows a first embodiment of a filter assembly comprising a plurality of perforated and non-perforated filter modules.

In the illustrated embodiment, a seal arrangement 122 is provided below the surface 101 and above the filter assembly 108 to prevent contaminant gases being released into the atmosphere. The seal arrangement 122 extends between the annulus created between the outer casing 105 and the filter assembly 108 as shown in FIG. 1B and prevents any gaseous contaminants that may have escaped filtration by the filter assembly from escaping via the annulus, with the only exit point being via the filter assembly. The seal arrangement 122 also has inner openings configured to permit the transmission of purified gases from the filter assembly 108 into an overlying collection zone 124 where they can be collected for further processing and storage. At the well head 104, the gases are collected from the production casing 106 and the collection zone 124 by respective outlet pipes 125A and 125B, as shown in FIG. 1A. The fluids and gases from the collection zone 124 may be extracted by the vacuum generated by the flow of pressurised fluids and gases in the production casing 106 that create a Venturi effect at a Venturi ejector pump 126 in the production outlet pipe 125A and provides a vacuum for removing the filtered gases from the collection zone 124 via pipe 125B. It will be appreciated that the vacuum created by the Venturi ejector pump 126 may increase the extraction of filtered gases from the collection zone 124 without using a mechanical pump, which may assist in reducing energy consumption at the well head 104. It will also be appreciated that there will be a differential pressure between the production casing 106 and the collection zone 124, which will be beneficial for extraction of gas in the collection zone 124. In a further embodiment a mechanical pump may be used in addition or as an alternative to assist in the extraction of filtered fluids and gases.

In addition, a separator (not shown) may be located downstream of the Venturi pump 126 to separate the fluids and gases based on their different properties, which can then be stored, for example, in one or more tanks for further processing. A blowout preventer, choke line and kill line (not shown) may also be provided at the well head 104 in order to control and secure the integrity of the wellbore and prevent the uncontrolled release of production fluids, such as shale gas, from the borehole 107.

FIGS. 10A-10D show a second embodiment of a system 1200 for contaminant extraction from the borehole 107. The system 1200 comprises a similar structure as that described above for the first embodiment shown in FIG. 1A, except that the filter assembly includes the lower filtering stage for filtering solid contaminants being located in the borehole 107 and an upper filtering stage for filtering fluid contaminants being located externally of the borehole 107 at the surface.

Figure 10A:
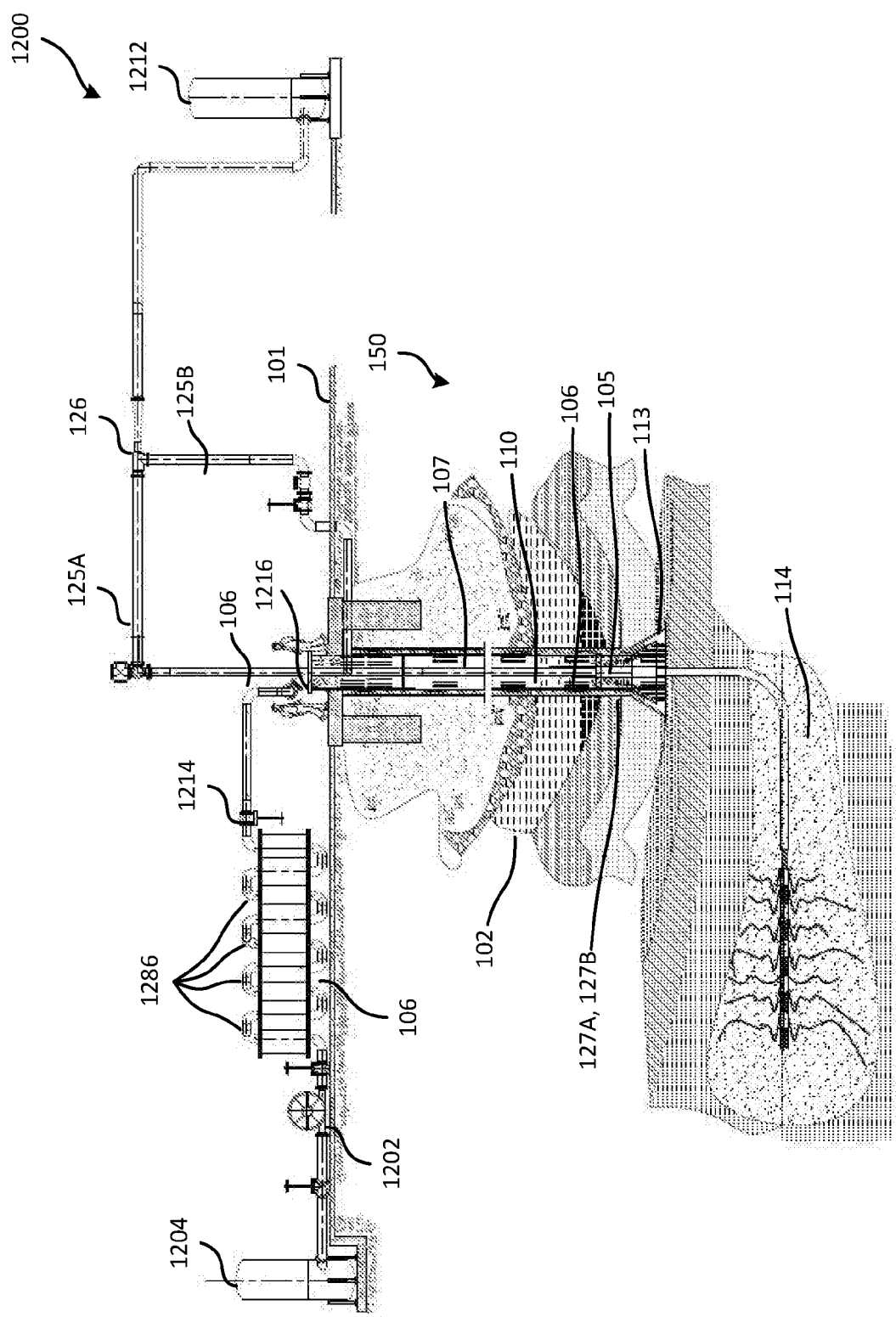
FIG. 10A is a sectioned perspective view of a second embodiment of a system for contaminant extraction in a borehole.
Figure 10B:
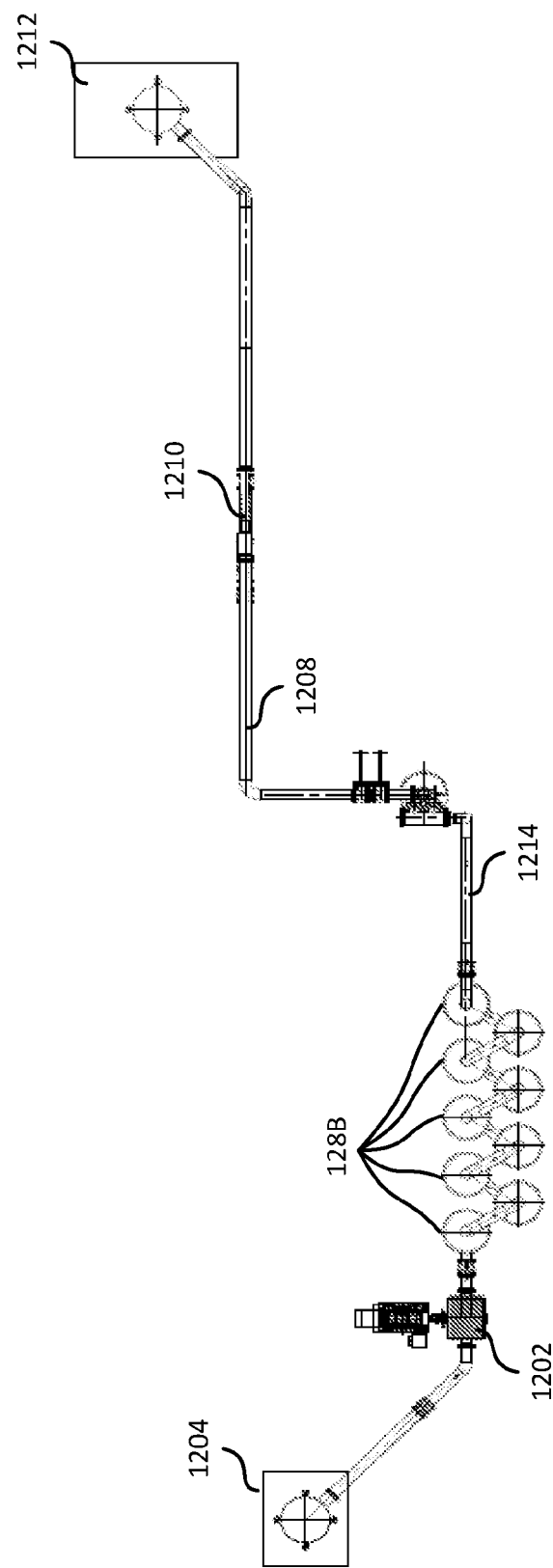
FIG. 10B is a top view of the system for contaminant extraction shown in FIG. 10A.
Figure 10C:
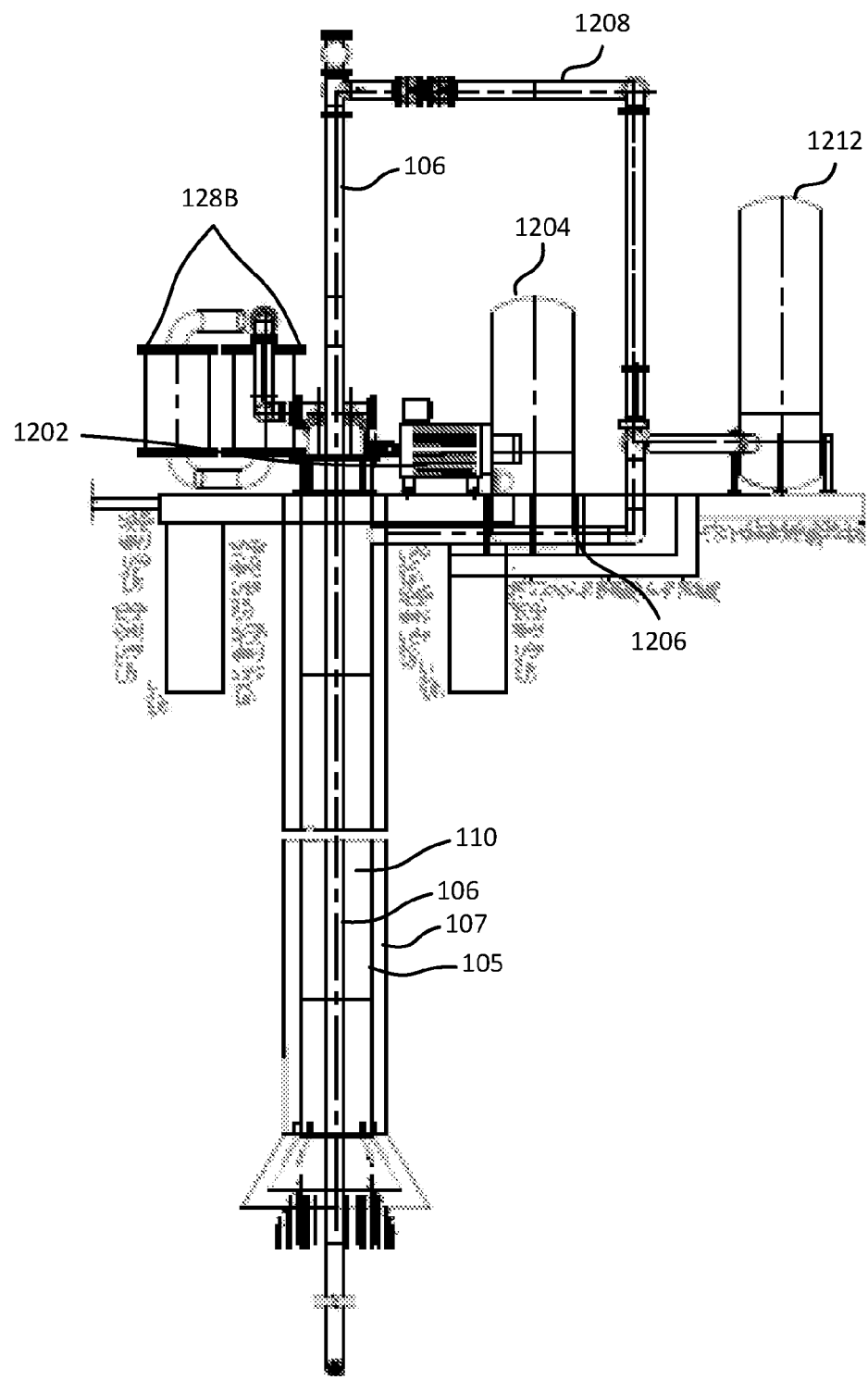
FIG. 10C is a side view of the system for contaminant extraction shown in FIGS. 10A-10B.
Figure 10D:
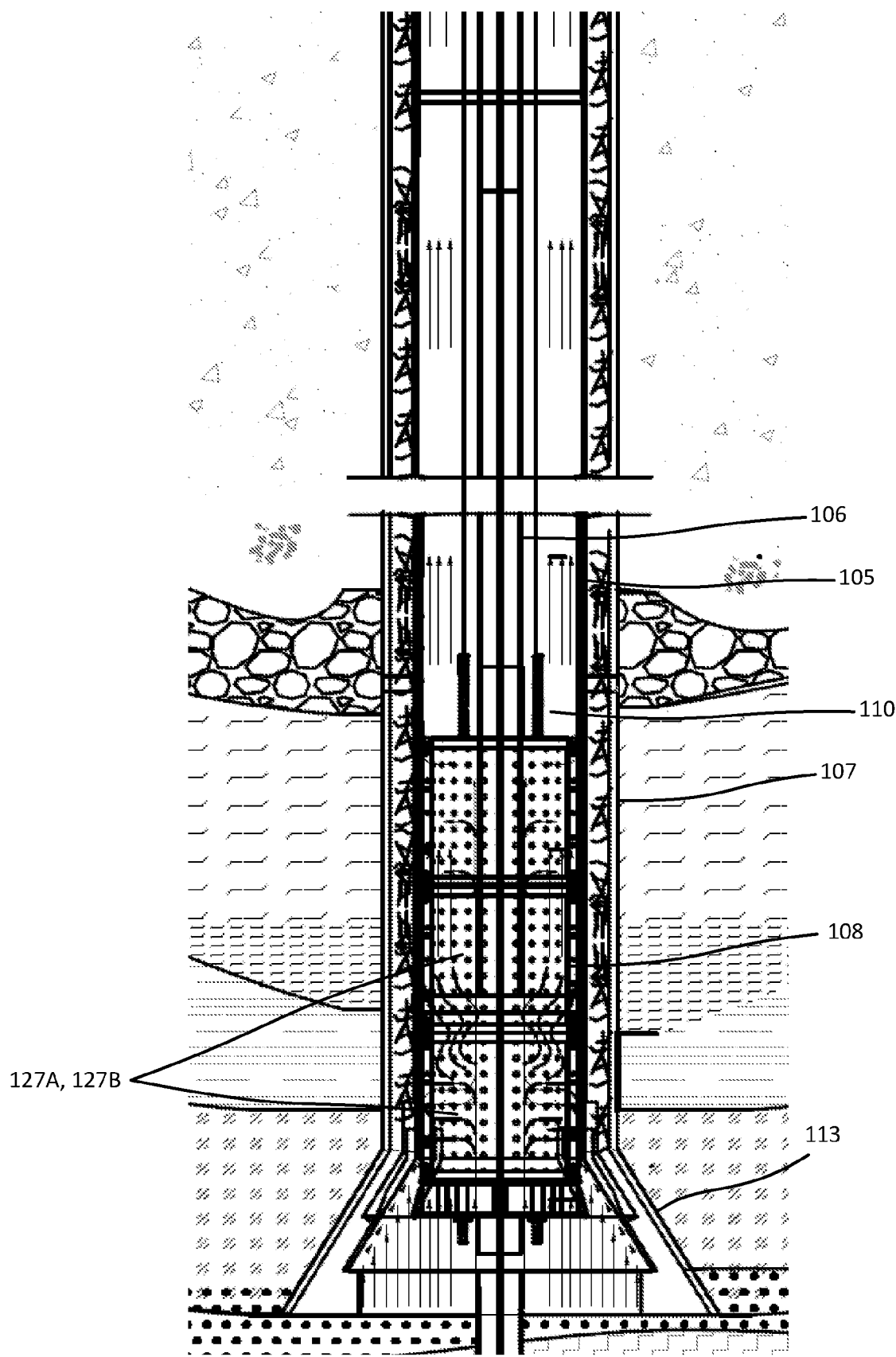
FIG. 10D is an enlarged view of Inset B of FIG. 10A and shows the second embodiment of a filter assembly comprising a plurality of perforated filter modules located in the borehole.

As shown in FIG. 10D, the lower filtering stage comprises a plurality of perforated filter modules 127 coupled end-to-end, which are located in the borehole 107 in the intermediate zone 110 located between the production casing 106 and the outer casing 105 to perform in-situ filtering of solid contaminants that may have leaked from the production zone 114 or been contaminated by leaked liquid or gaseous contaminants released from the production zone 114. The solid, liquid and gaseous contaminants released from the production zone 114 are directed towards the perforated filter modules 127 by funnel 113 that is located at the lowermost portion of the outer casing 105 below the lowermost perforated filter module.

The fluid or gaseous contaminants that have passed through the perforated filter modules 127 migrate upwards through the intermediate zone 110 towards the surface 101. A sealing cap 1216 is provided at the uppermost portion of the outer casing 105 in order to prevent the fluid and gaseous contaminants from escaping the intermediate zone 110 and entering the atmosphere. The fluid and gaseous contaminants reside in the intermediate zone 110 located below the sealing cap 1216 where they are captured by outlet pipe 1214 for further filtering by the upper filtering stage 128 that is located externally of the borehole 107.

The upper filtering stage 128 comprises a series of non-perforated filter modules 128b for filtering fluid contaminants, including liquid and gaseous contaminants, extracted from the intermediate zone 110.

A vacuum pump 1202 operates downstream of the upper filtering stage 128 to extract the fluids and gases under a vacuum from the intermediate zone 110 through outlet pipe 1214 and into the series of non-perforated filter modules 128b. The resulting fluids and gases that have been filtered from the non-perforated filter modules 128b are stored in a filtered gas storage tank 1204.

Unfiltered or raw fluids and shale gases from the production casing 106 are also extracted by a series of production outlet pipes 125A and 125B, The raw or unfiltered fluids and gases may be extracted by a vacuum generated by the flow of pressurised fluids and gases in the production casing 106 that create a Venturi effect at a Venturi ejector pump 126 in the production outlet pipes 125A, 125B. Unfiltered or raw gases extracted from the production pipe may be stored in an unfiltered or raw gas storage tank 1212 for further filtering and processing.

Figure 11A:
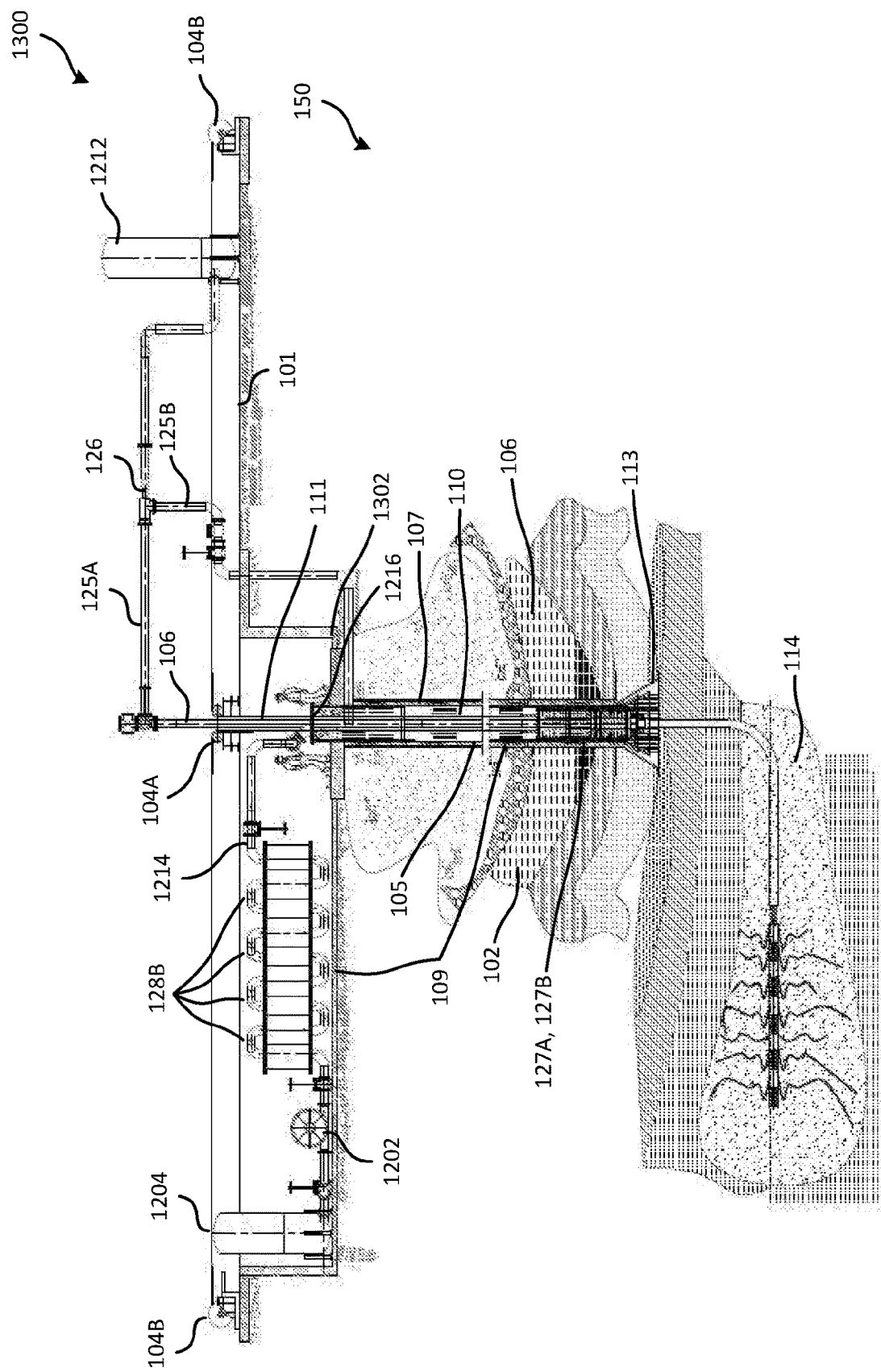
FIG. 11A is a sectioned perspective view of a third embodiment of a system for contaminant extraction in a borehole.
Figure 11B:
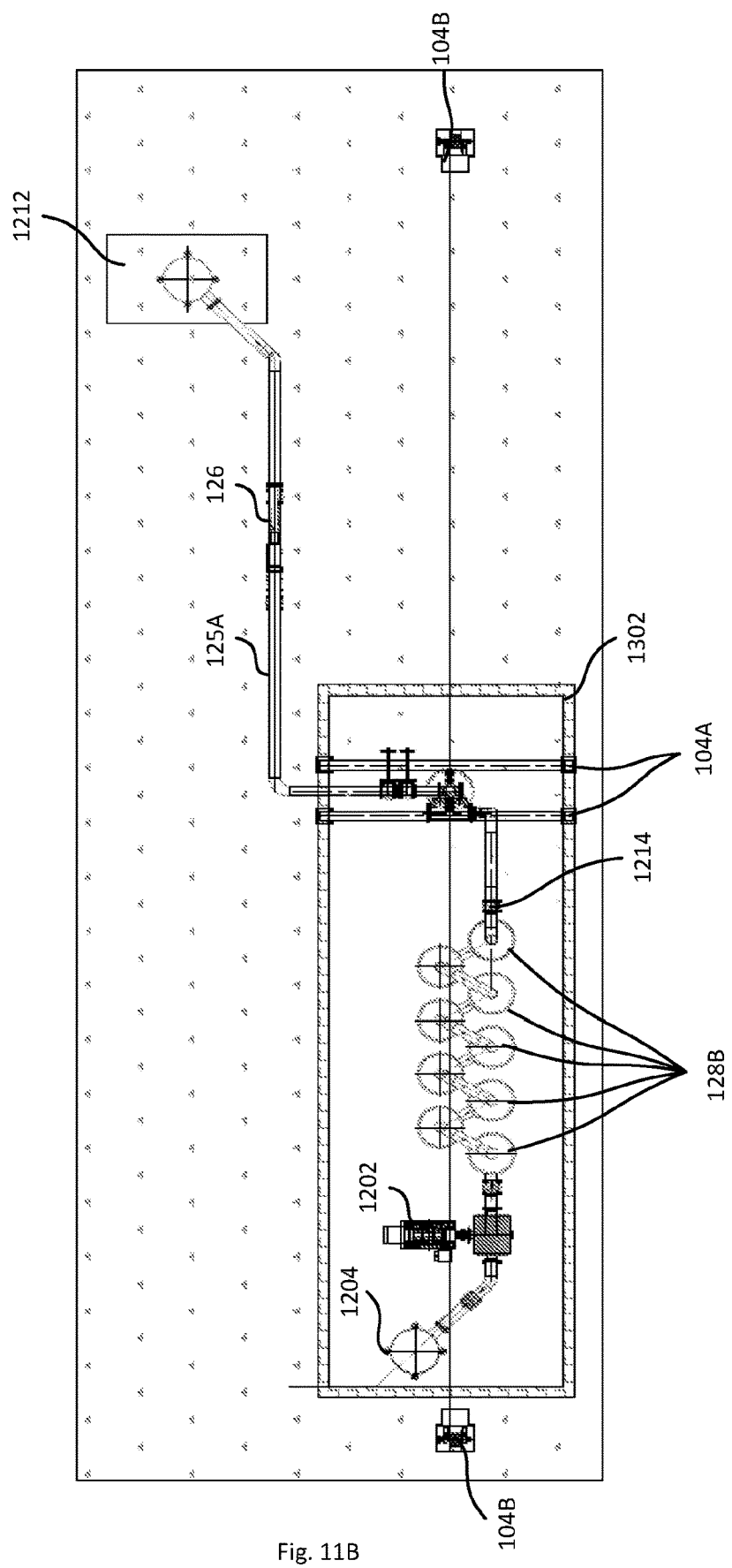
FIG. 11B is a top view of the system for contaminant extraction shown in FIG. 11A.
Figure 11C:
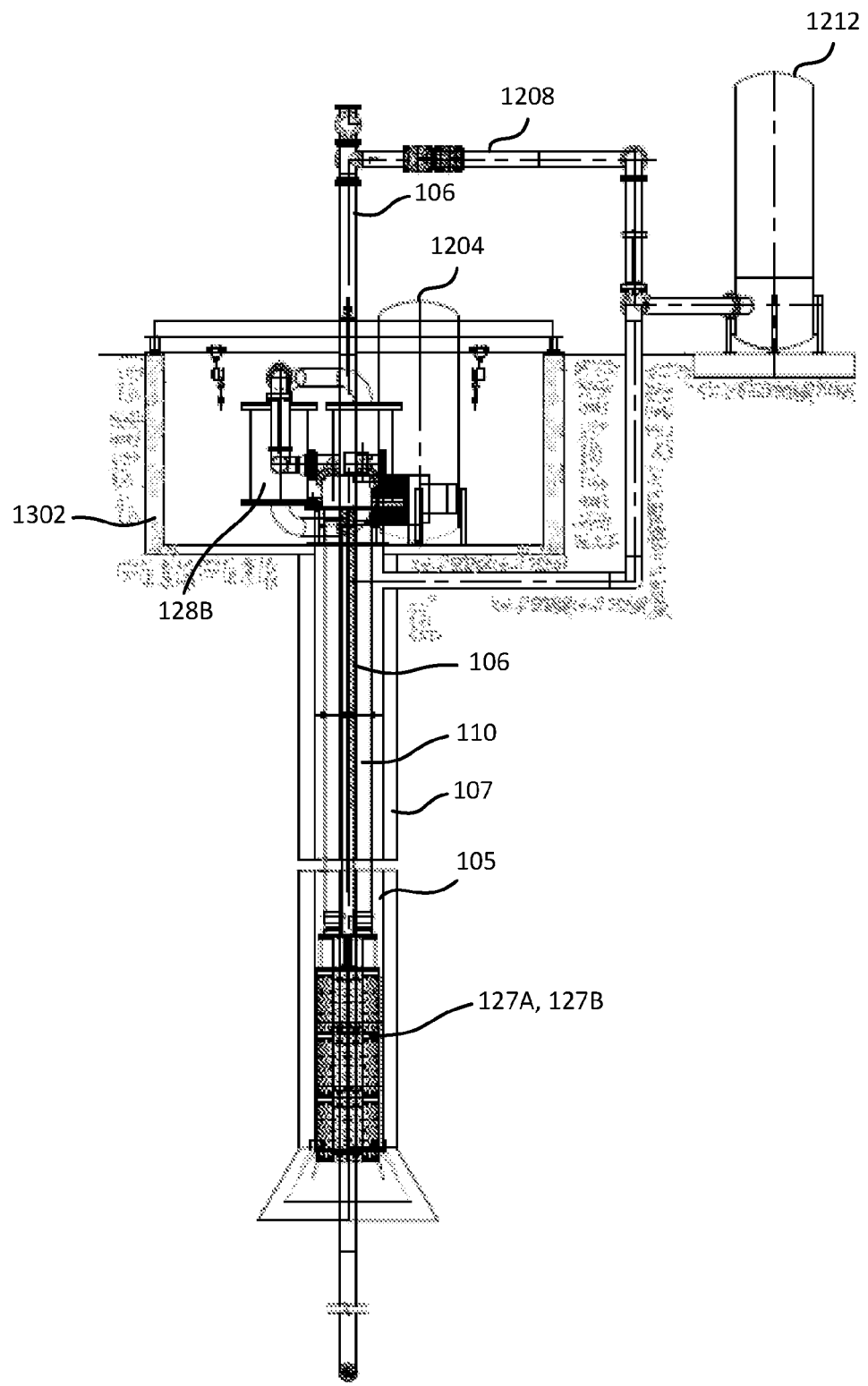
FIG. 11C is a side view of the system for contaminant extraction shown in FIGS. 11A-11B.

In the third embodiment of FIGS. 11A-11C, a system 1300 for contaminant extraction is shown. The system 1300 comprises a similar structure as that described above for the second embodiment shown in FIGS. 10A-10D, except that the upper filtering stage 128 comprising the series of non-perforated filter modules 128b and the associated processing and storage equipment 1202, 1214, 1204 are located externally of the borehole 107 within an underground or below ground pit 1301. A surface-based winding assembly comprising an overhead gantry 104A and dual cable drum arrangement 1048 is also provided for lowering the support cradle assembly 112 and one or more perforated filter modules 127 of the lower filtering stage via cables 111 into the borehole 107.

In a fourth embodiment, a system for contaminant extraction may have a structure similar to that shown in FIGS. 1A, 10A-10D and 11A-11C comprising a filter assembly 108 having a lower filtering stage and primary upper filtering stage located within the borehole 107 and a secondary upper filtering stage located externally of the borehole 107. Within the borehole, the lower filtering stage includes a plurality of perforated filter modules 127a, 127b for filtering solid contaminants and a primary upper filtering stage includes a plurality of non-perforated filter modules 128a for filtering fluid contaminants, including liquid and gaseous contaminants. The fluids and gases are then extracted from the borehole 107 for further filtering by a secondary upper filtering stage including a plurality of serially connected non-perforated gas or fluid filter modules 128b located externally of the borehole 107.

The components of each system will now be described in further detail.

Filter Assembly

In the embodiments shown in FIGS. 1A, 10A and 11A, the filter assembly 108 may comprise a lower filtering stage including a plurality of perforated filter modules 127 for filtering solid contaminants and an upper filtering stage including a plurality of non-perforated filter modules 128 for filtering fluid and/or gaseous contaminants. In another embodiment, the filter assembly 108 may include at least one hybrid filter configured to filter both solid and fluid contaminants by having a lowermost perforated filter portion and an uppermost non-perforated filter portion.

Figure 2:
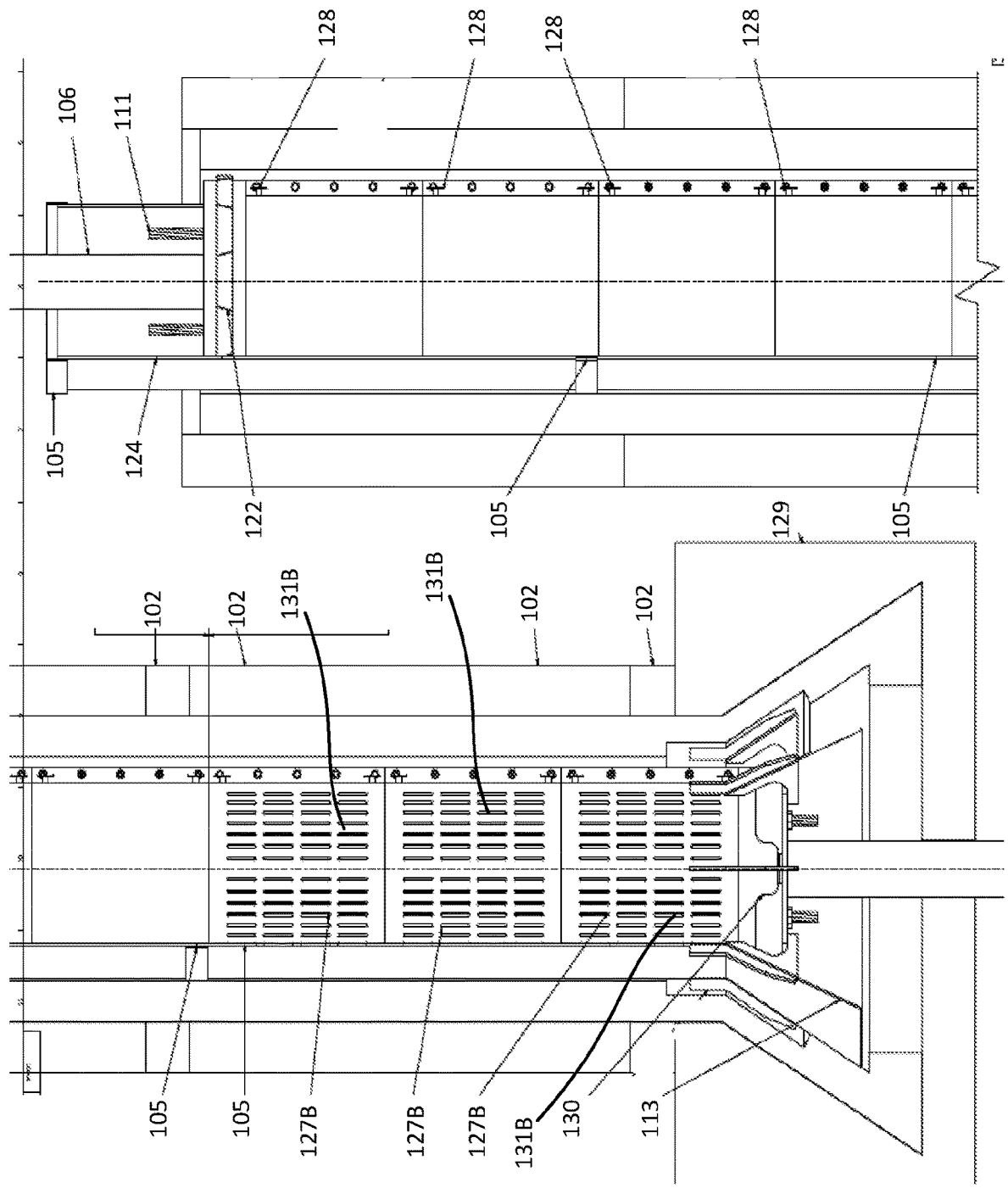
FIG. 2 is a sectioned view of a second embodiment of the filter assembly shown in FIG. 1B.
Figure 3A:
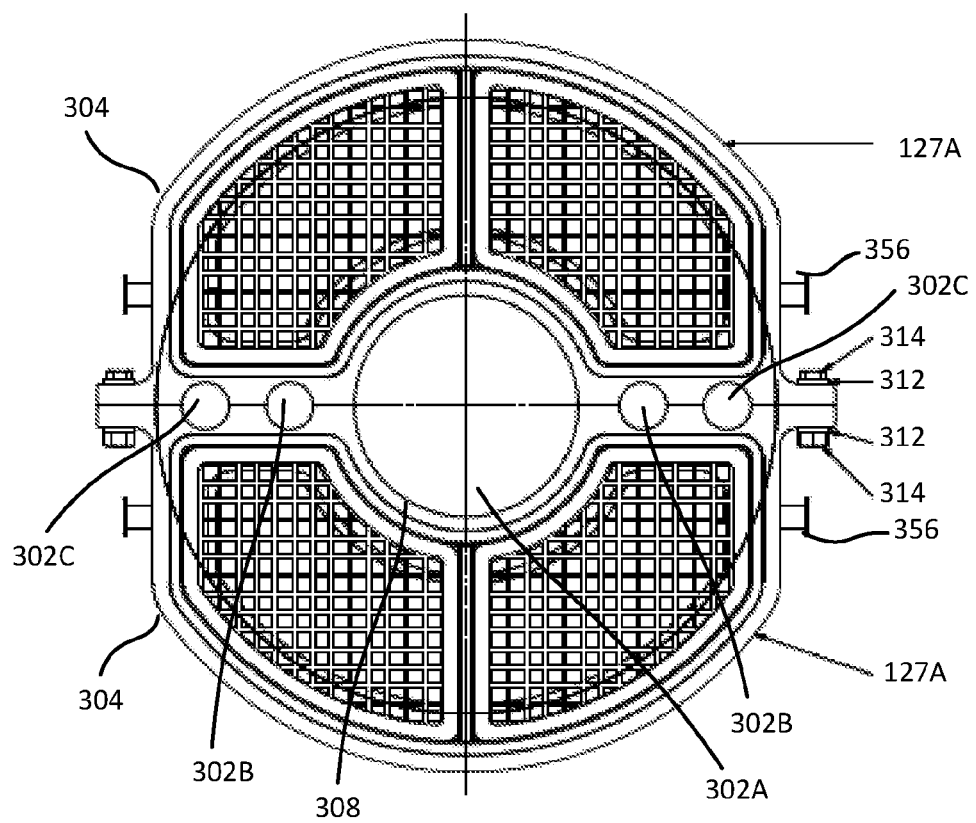
FIG. 3A is a top view of a filter module of the filter assemblies shown in FIG. 2.
Figure 3B:
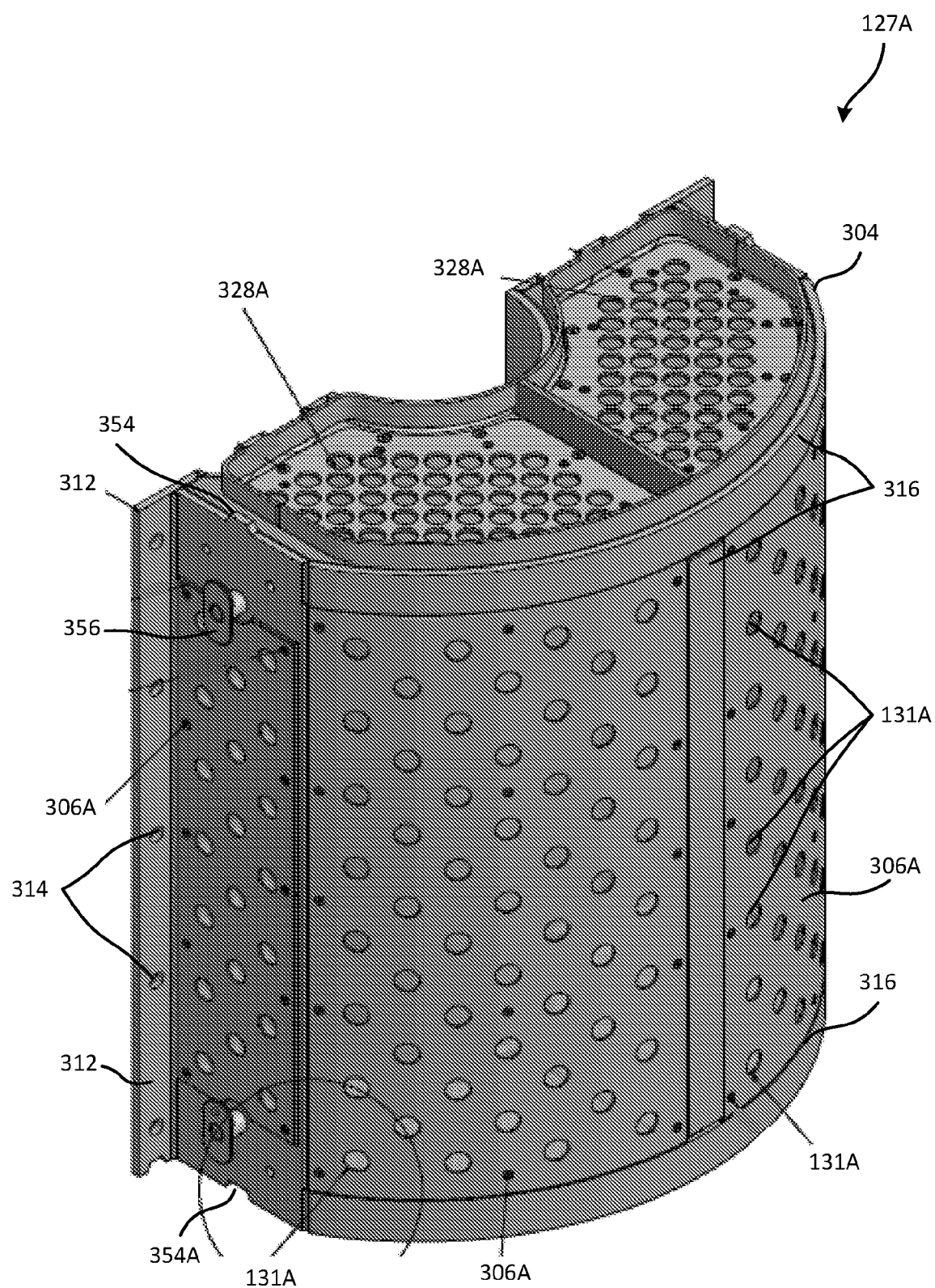
FIG. 3B is a perspective view of a perforated filter module of the filtering assembly shown in FIG. 1B.
Figure 3C:
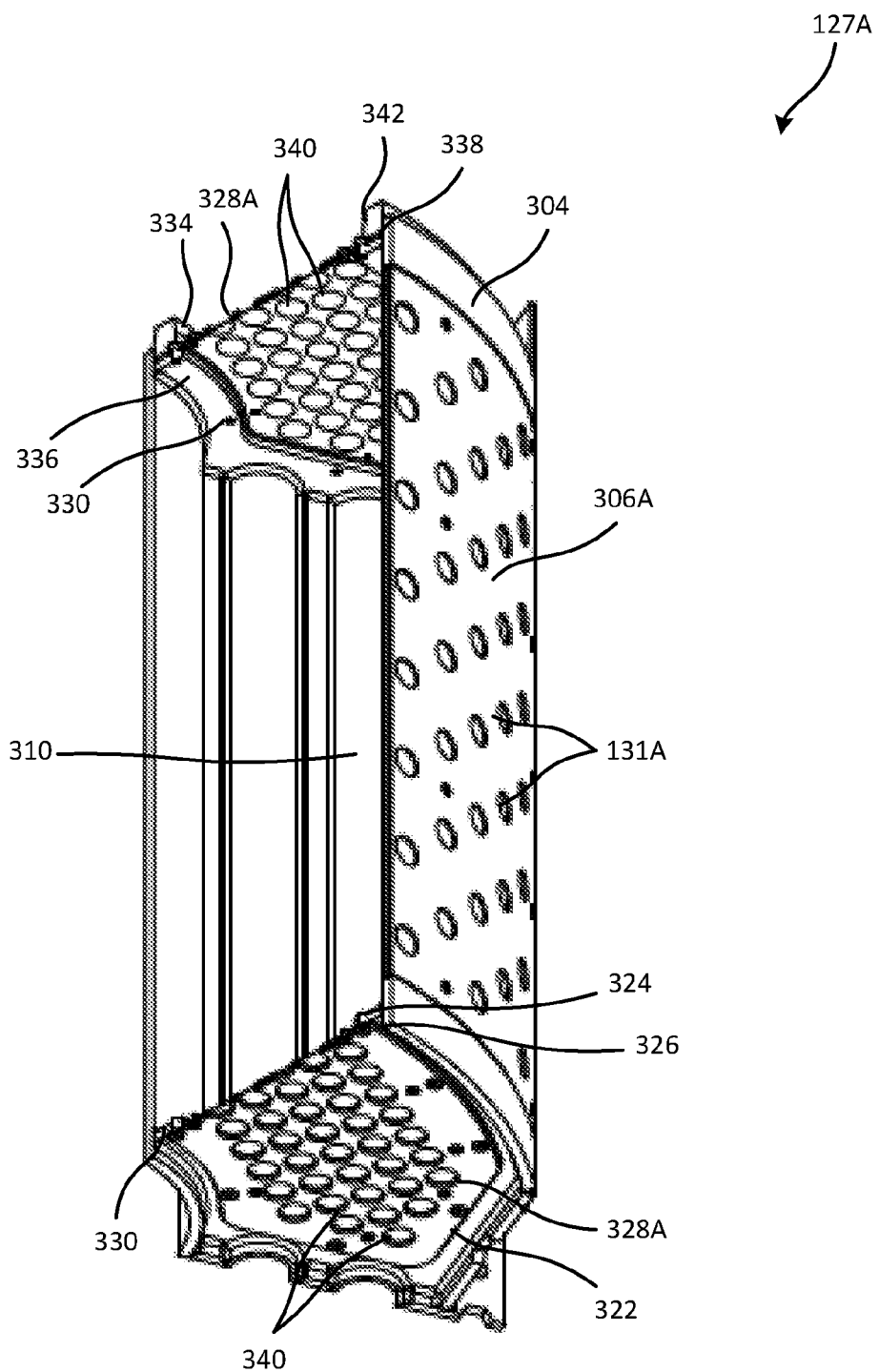
FIG. 3C is a sectioned perspective view of the perforated filter module shown in FIG. 3B.

In a first embodiment, the perforated filter module 127a comprises a cylindrical sidewall 306a having a plurality of perforations 131a in the configuration shown in FIGS. 1B and 3B-3C. A second embodiment of the perforated filter module 127b is also shown in FIGS. 2 and 4A. A first embodiment of the non-perforated filter module 128a is also shown in FIGS. 1B, 2 and 5A-5B and may comprise a solid exterior cylindrical sidewall 306c. A second embodiment of the non-perforated filter module 128b is also shown in FIGS. 12A-12D. It will be appreciated that the filter modules 127a-b, 128a-b of the filter assembly may have any suitable shape or configuration. For example, filter modules 127a-b and 128a that are to be inserted into the borehole may have any suitable shape or configuration that permits them to be retrofitted around the production casing 106 and lowered into borehole 107. In one example shown in FIGS. 3A and 3D, each filter module may comprise two semi-annular housings 304 bolted together at flanges 312. In another example, the two semi-annular housings may be connected by a hinge. In yet another example, each filter module 127a-b, 128a may include a U-shaped profile for receiving the production casing 106, and an insert having an arcuate profile that engages the U-shaped filter portion and completes the filter module so that it surrounds the circumference of the production casing 106. In another example, each filter module may be segmented into three or more interconnecting portions that surround the circumference of the production casing 106.

FIG. 1B shows a filter assembly 108 comprising a plurality of perforated filter modules 127a in combination with a plurality of non-perforated filter modules 128a. The filter assembly 108 is located in the intermediate zone 110 between the outer casing 105 and the production casing 106 that extends through the water permeable layer 102 and an underlying impermeable layer 129. A first perforated filter module 127a is located on the support cradle 112. The support cradle 112 is secured with the pair of cables 111 by locking shims 808. The filter modules 127a are stacked on top of each other with the load of the filter modules 127a being supported by the support cradle 112. Additional perforated filter modules 127a are then sequentially fitted around the cables 111 and coupled to an underlying perforated filter module.

Once a suitable number of perforated filter modules 127a have been lowered through the outer casing 105, a plurality of non-perforated filter modules 128a are fitted around the pair of cables 111 or suspended on top of the previously inserted filter modules and lowered into place so that they reside above the perforated filter modules 127a. Contaminant gases or fluids will travel upwards around the outer wall of the production casing 106 and be directed through apertures 130 in the support cradle 112 and through the perforated filter modules 127a.

In another embodiment, perforated and non-perforated filter module halves may be clamped individually around the cables 111 and supported independently relative to adjacent filter modules.

Solid contaminants, such as slurry borne clay fragments, rock fragments or heavy-element impurities or radioactive containing impurities, will be filtered from the fluids or gases by the perforated filter modules 127a, 127b. These fluids or gases will travel through the perforated filter modules 127a, 127b and into the non-perforated filter modules 128a where fluid or gaseous contaminants will be further filtered. The resulting purified gases will travel through apertures in the seal 122 into the overlying collection zone 124 where they can be collected for further processing and storage via outlet pipe 125B.

FIGS. 10A-10D and 11A-11C show a filter assembly 108 comprising a lower filtering stage including a plurality of perforated filter modules 127a located in the borehole 107 and an upper filtering stage including a plurality of non-perforated filter modules 128b located at the surface 101 or in an underground or below ground pit 1301. As shown in FIG. 10D, the perforated filter modules 127a are located in the intermediate zone 110 between the outer casing 105 and the production casing 106 that extends through the water permeable layer 102 and an underlying impermeable layer 129. A first perforated filter module 127a is located on the support cradle 112 that is located within the funnel 113 to secure the filter modules within the borehole 107. The perforated filter modules 127a are stacked on top of each other with the load of the filter modules 127 being supported by the support cradle 112. Additional perforated filter modules 127a and/or 127b are then sequentially fitted around the cables 111 and coupled to an underlying perforated filter module.

Contaminant gases or fluids will travel upwards around the outer wall of the production casing 106 and be directed through apertures 130 in the support cradle 112 and through the perforated filter modules 127a and 127b. Solid contaminants, such as clay fragments, rock fragments or heavy-element impurities or radioactive containing impurities, will be filtered from the fluids or gases by the perforated filter modules 127a, 127b. These fluids or gases will migrate upwards through the perforated filter modules 127a, 127b and intermediate zone 110 towards the underside of sealing cap 1216. The fluids or gases are then extracted into the series of surface-based non-perforated gas filter modules 128b located externally of the borehole 107 for further filtering. The purified gases extracted from the series of gas filter modules 128b may be processed further or stored in storage tank 1204.

Each embodiment of the perforated and non-perforated filter modules will now be explained in more detail below.

First Embodiment of the Perforated Filter Module

FIGS. 1B and 3B-3C show a first embodiment of a perforated filter module 127a for filtering solid contaminants, such as clay fragments, rock fragments, heavy-element impurities or radioactive containing impurities. As shown in FIG. 3A, the perforated filter module 127a defines a plurality of cylindrical channels 302, including a central channel 302a for accommodating one or more production casings 106 and a pair of inner surrounding channels 302b for receiving the pair of steel support cables 111 and outer channels 302c for insertion of measuring instrumentation through the filter module 127a.

As shown in FIGS. 3B-3C, the first embodiment of the perforated filter module 127a further comprises two opposing semi-annular housings 304 each comprising a plurality of exterior apertured sidewalls 306a and a solid interior sidewall 308 that define a semi-annular chamber 310 for the insertion of suitable physical filter media, such as zeolite. Flanges 312 extend from the interior sidewall 308 and comprise a series of apertures 314 for allowing the semi-annular housings 304 to be bolted together to form the perforated filter module 127a. In the embodiment shown in FIGS. 3B-3C, each exterior sidewall panel 306a is formed from sheet metal such as stainless steel and is riveted, spot welded or otherwise secured to a frame 316. In yet another embodiment, each semi-annular housing 304 is integral with the frame 316.

As shown in FIGS. 3B-3C, each exterior sidewall panel 306a is provided with a plurality of circular shaped apertures 131a suitably sized and spaced, for example, having a diameter of 5-12 mm, to permit the flow of contaminant fluids and/or gases to enter the perforated filter module and allow solid contaminants that may be entrained in the contaminant fluids and/or gases that have escaped the production zone to be filtered. This may result in large sized contaminants being filtered before they reach and potentially clog the filter media located within the semi-annular chamber 318 of each filter housing 304. The shape and size of these apertures 131a are also designed in a way to transfer the load applied on these modules consistently so that structural integrity of the modules are maintained. The apertures 131a are also suitably sized and shaped to keep the filter media in place within the housing 304 and to allow the maximum flow of contaminants into the lower stages of the filter assembly to allow the maximum pre-filtration of these contaminants by the physical or chemical filter media located within these modules before they reach the upper stage non-perforated filter modules.

It will be appreciated that metallic perforated filter modules are more suited to being located towards the lowermost portions of the filtering assembly 108 as these modules 127a provide strength and support to the filtering assembly 108. It will also be appreciated that the metallic composition of the perforated filter modules 127a may also reduce the likelihood of these modules deforming under the combined weight of the overlying modules.

Located towards the lowermost portion of each filter housing 304 is a basal recess 322 defined by a lowermost flange 324 and a lowermost protrusion 326 for engaging an uppermost flange 338 of an underlying filter module or the support cradle 112, as shown in FIG. 3C. A perforated base plate 328a is riveted or screwed to the lowermost flange 324.

The uppermost portion of the housing 304 comprises an upper recess 334 defined by an uppermost flange 336 and uppermost protrusion 338 for coupling the lowermost flange and protrusion 324 and 326 of a subsequently inserted filter module so that adjacent filter modules are coupled together via a nested coupling. An upper perforated cover plate 328a is screwed or riveted to the uppermost flange 336

In one embodiment, the perforated cover plate 328a may be divided into separate left and right cover plates. In another embodiment, the perforated cover plate 328a may be a single cover. In another embodiment the perforated cover plate 328a may be integral with the housing 304 of the filter module 127a.

In the embodiments shown in FIGS. 3B and 3C, the perforated cover plate 328a also comprises a plurality of circular apertures 340 suitably sized and shaped to permit filtered fluid and/or gas to flow therethrough.

Optionally, a seal 342 may be provided within the upper recess 334 to minimise gaseous contaminants from escaping between adjacent filtering modules, as shown in FIG. 3C.

Figure 3D:
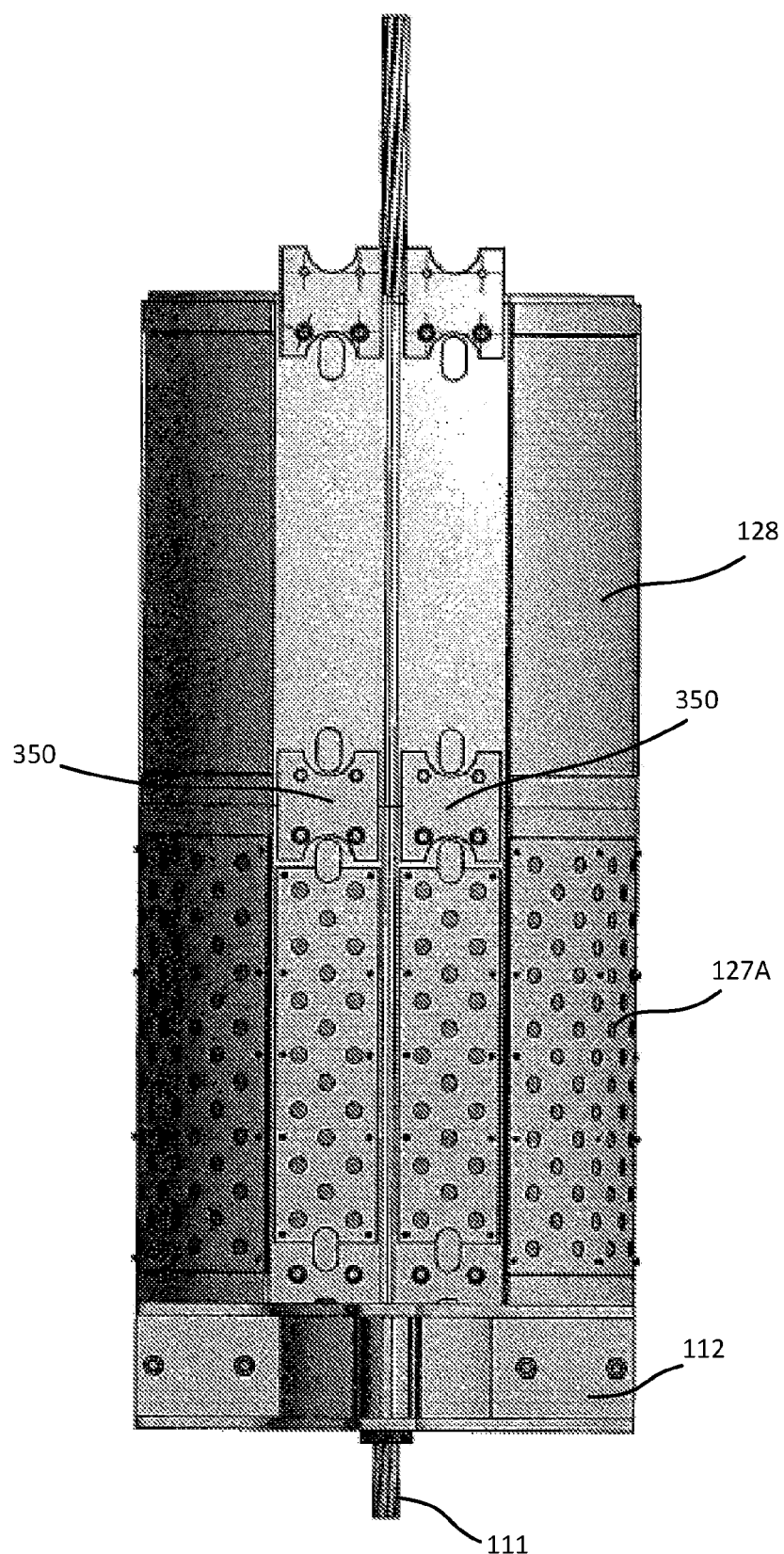
FIG. 3D is a side view of the first embodiment of the filter assembly shown in FIG. 1B.
Figure 4A:
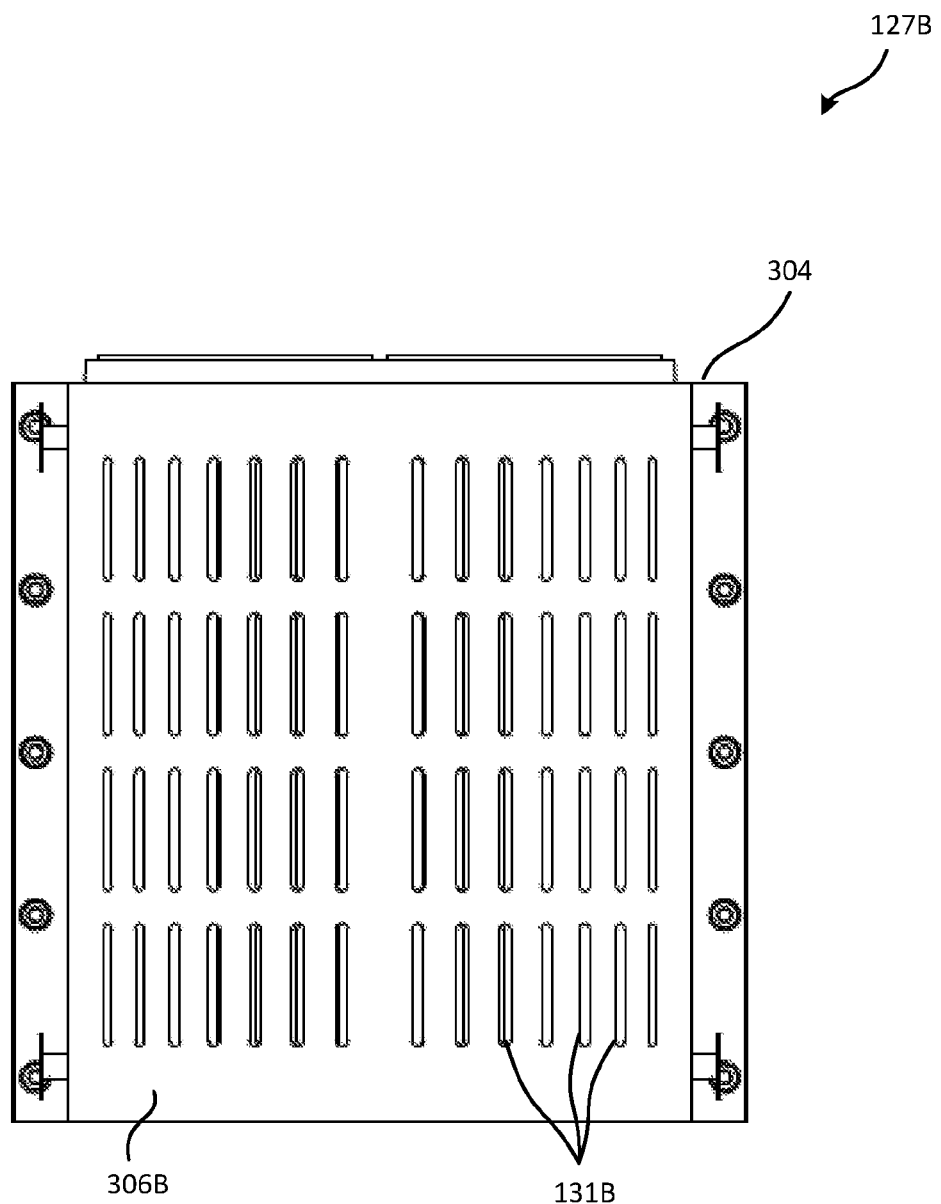
FIG. 4A is a front view of a perforated filter module of the filtering assembly shown in FIG. 2.

In order to provide additional coupling between filter modules, apertured joining plates 350 may be provided towards the uppermost and lowermost portions of the housing 304, as shown in FIG. 3D.

It is to be appreciated other forms of couplings different from the ones described above, such as a threaded coupling, may be used. A location tab 354, shown in FIG. 3B, may also be provided that assists in aligning and positioning of the subsequently inserted filter modules with the underlying filter module by locating in a corresponding recess 354A.

A plurality of lifting lugs 356 may also be provided on the exterior sidewalls 306a to assist in the lifting of the filter module 127a from the borehole 107 or preferably for lifting the filter module 127a during transportation or processing once it has been removed from the borehole 107.

Second Embodiment of the Perforated Filter Module

Figure 4B:
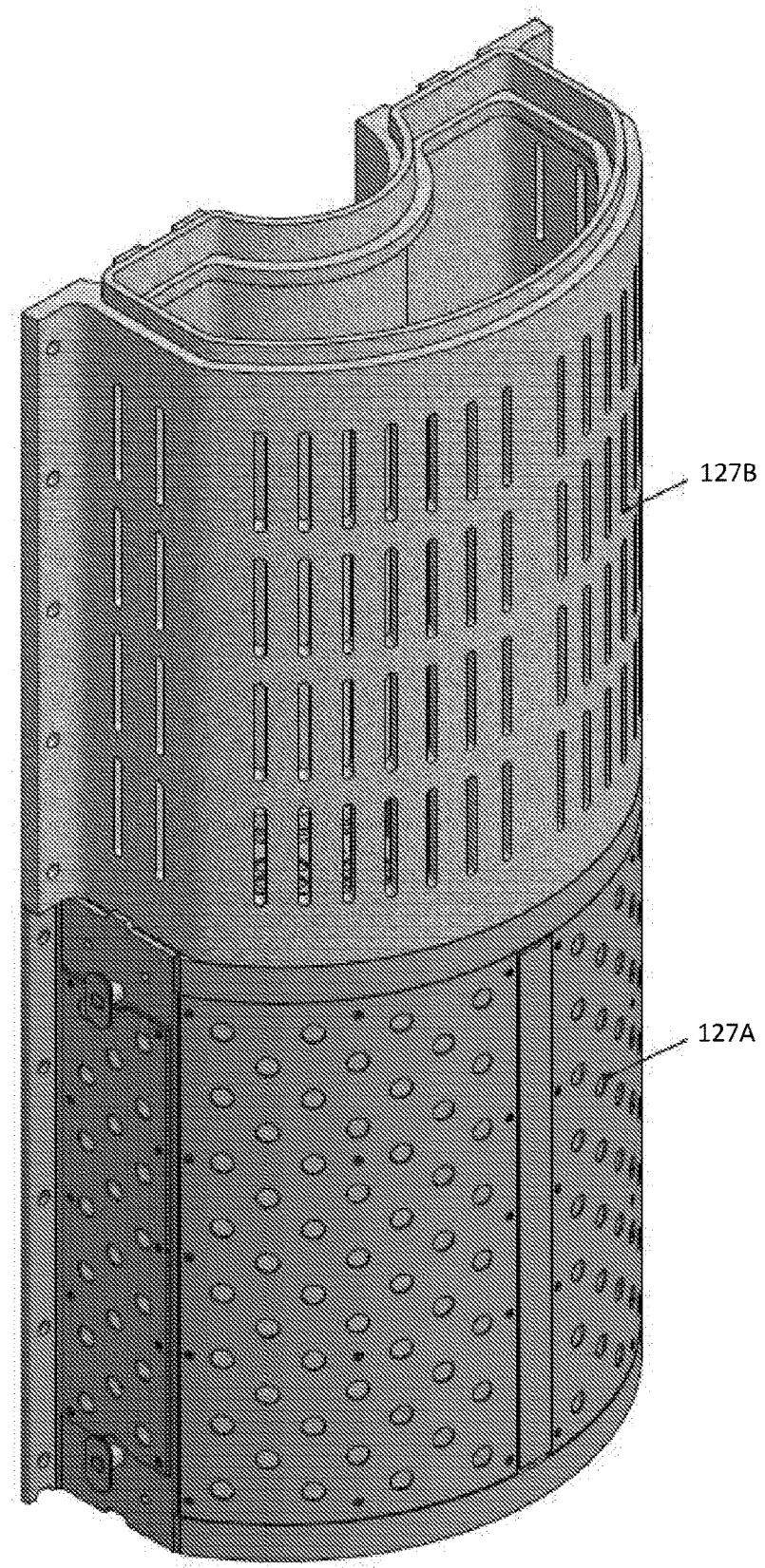
FIG. 4B is a perspective view of the perforated filter modules shown in FIGS. 3B-3C and 4A.

FIGS. 4A-4B illustrate a second embodiment of a perforated filter module 127b for filtering solid contaminants, such as clay fragments, rock fragments, or heavy-element-containing or radioactive-containing contaminants. This comprises a similar structure to the first embodiment of the perforated filter module 127a shown in FIGS. 1B and 3B-3C; except that each opposing semi-annular housing 304 comprises a singular exterior sidewall 306b integrally formed with the interior sidewall 308 and flanges 312, typically moulded from Fibre Reinforced Plastic (FRP) or Glass Reinforced Plastic. The exterior sidewall 306b comprises a plurality of elongate apertures 131b and, in one example, these apertures have a length of 166 millimetres and a width of 12 mm, though it will be understood that these dimensions are variable, and may be reduced as between upper and lower modules The elongated shape and spacing of these apertures 131b may assist in transferring the load applied to the exterior sidewall 306b of the filtering module 127b vertically and assist in reducing lateral deformation.

Figure 4C:
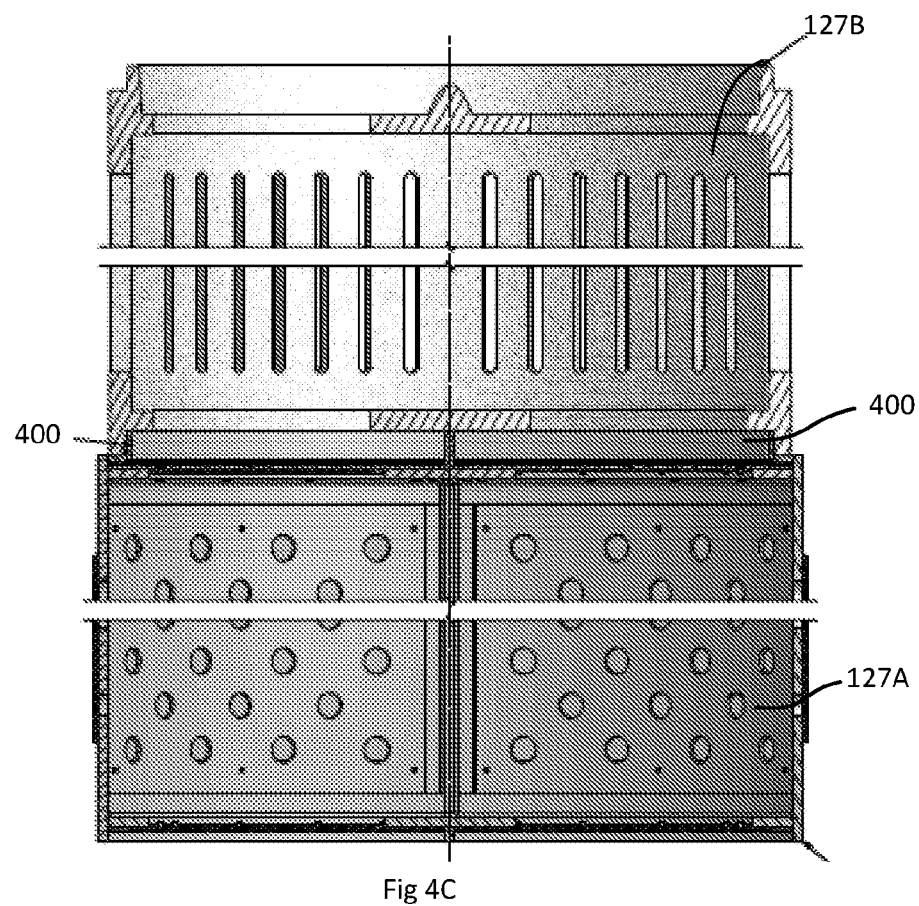
FIG. 4C is a side view of an adaptor to be used between the perforated filter modules shown in FIG. 4B.
Figure 4D:
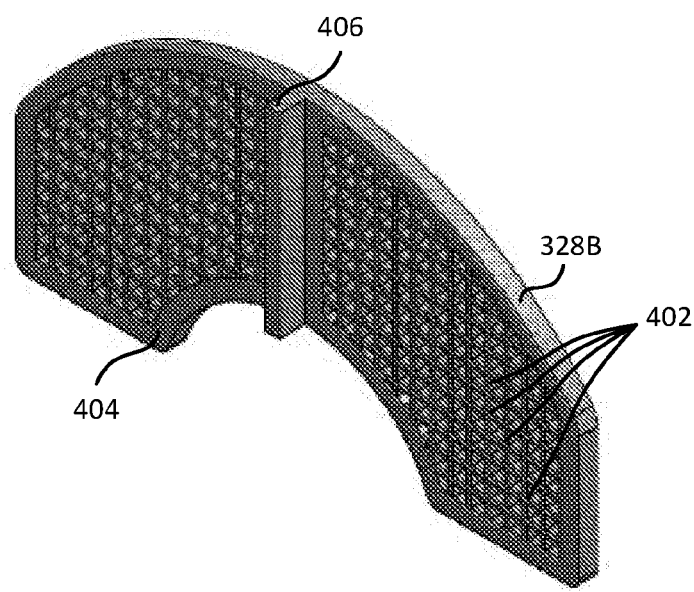
FIG. 4D is a perspective view of one embodiment of a perforated plate.

In the example shown in FIG. 4B, the second embodiment of the perforated filter module 127b is subsequently inserted above the first embodiment of the perforated filter module 127a. In this example, the first embodiment of the perforated filter module 127a is formed of metallic material with a corrosion resistant coating and the second embodiment of the perforated filter module 127b is formed of FRP. Since the thicknesses of these materials are different for each filter module, an adaptor plate 400 is provided between the adjacent modules 127a, 127b, as shown in FIG. 4C. It will be appreciated that using FRP for the filter modules that are subsequently inserted through the outer casing 105 assists in reducing the overall weight of the filtering assembly 108 and maximizes the corrosion resistance of the filter modules.

FIG. 4C also shows another embodiment of a perforated cover 328b that may be affixed to an uppermost and/or lowermost flange of the housing 304, respectively. The embodiment of the perforated cover 328b shown in FIG. 4C has a plurality of square shaped apertures 402 where each aperture has an exemplary width of 19 mm. Located on the underside 404 of the perforated cover 328b is a support 406 that engages the uppermost or lowermost flange of the housing.

First Embodiment of the Non-Perforated Filter Module

Figure 5A:
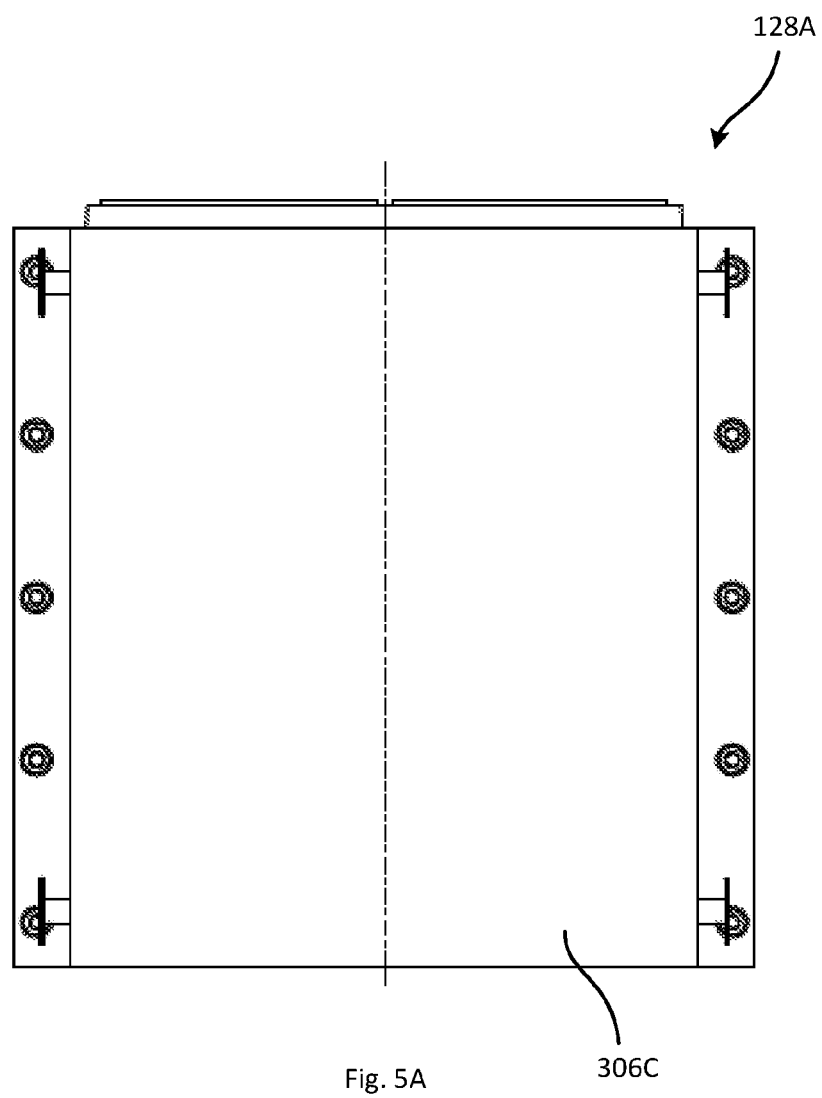
FIG. 5A is a front view of a non-perforated filter module of the filtering assemblies shown in FIGS. 1B and 2.
Figure 5B:
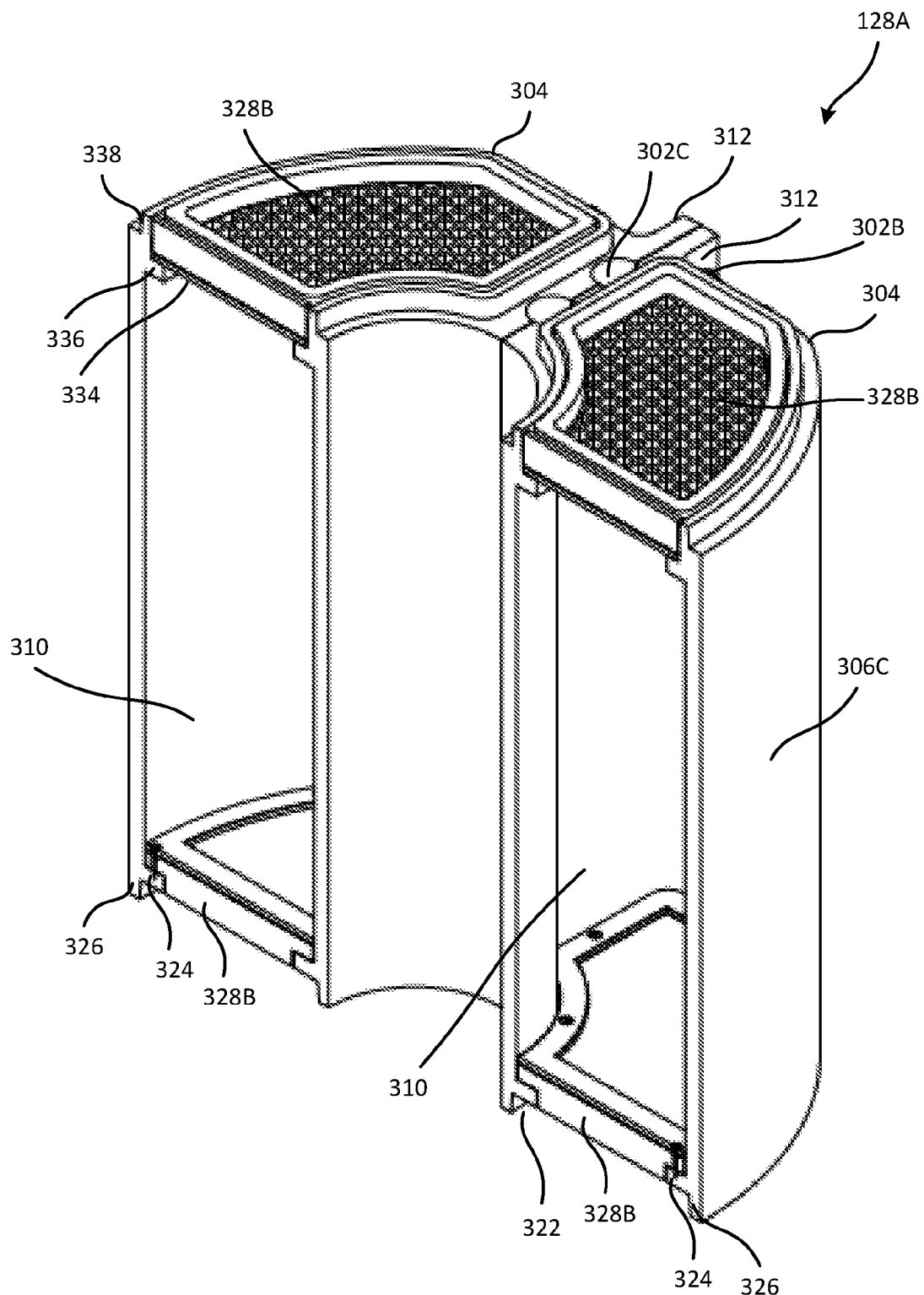
FIG. 5B is a perspective view of the non-perforated filter module shown in FIG. 5A.

FIGS. 5A-5B show a first embodiment of a non-perforated filter module 128a for filtering fluid and gaseous contaminants. The non-perforated filter module 128a comprises a similar structure as that described above for the first and second embodiments of the perforated filter modules 127a, 127b, except that each opposing semi-annular housing 304 comprises a singular solid exterior sidewall 306c integrally formed with the interior sidewall 308 and flanges 312.

As shown in the embodiment of FIG. 5B, the non-perforated filter module 128a may comprise a lowermost perforated cover 328b attached to the lowermost flange 324. An intervening apertured sheet 502, for example, a mesh may then be inserted above the lowermost perforated cover 328b and secured to the lowermost flange 324 by a fastening means 330, such as screws. Additionally, an intervening apertured sheet 502 may also reside within the upper recess 334 of the filter module below the upper perforated cover 328b. The intervening apertured sheet 502 may assist in keeping the filter media (described below) within the semi-annular chamber 310 of each housing 304. A gas tight seal 342 reduces or prevents the escape of gases from between adjacent filter modules.

As mentioned above, the non-perforated filter modules 128a may be inserted into the borehole 107 after the perforated filter modules 127a and/or 127b. This configuration may result in the underlying perforated filter modules 127a and/or 127b filtering out a large majority of solid contaminants before these contaminants reach the non-perforated filter module 128a.

It will be appreciated that the apertured sheet 502 could be formed from any suitable material for use in a corrosive environment such as a non-woven polyester fabric, woven fiberglass mesh, or metallic mesh coated with corrosion resistant material.

Second Embodiment of the Non-Perforated Filter Module

FIGS. 12A-12D show a second embodiment of a non-perforated gas filter module 128*b* for filtering fluid and gaseous contaminants externally of the borehole 107. The non-perforated filter module 128*b* comprises a cylindrical housing 1220 having a singular solid exterior sidewall 1222 defining an inner cylindrical chamber 1224 for the insertion of suitable filter media, such as a physical or chemical filter media. Flanges 1226 extend from the uppermost and lowermost portions of the solid exterior wall 1222 and each flange 1226 comprise a series of apertures for connecting to flanges 1228 of a domed end housing 1230*a*, 1230*b*. At the apex of each domed end housing 1230*a*, 1230*b* is a pipe 1232*a*, 1232*b* for serially connecting the filter module 128*b* to an upstream or downstream filter module or outlet pipe 1214. In the example shown in FIG. 12A, an inlet pipe 1232*a* is connected to the uppermost domed housing 1230*a* to receive contaminants from outlet pipe 1214, while an outlet pipe 1232*b* is connected to the lowermost domed housing 1230*b* to transmit filtered gases and fluids from the filter module to an adjacent downstream filter module for further filtering, each module forming part of a side-by-side array of similar serially coupled filter modules.

Figure 12A:
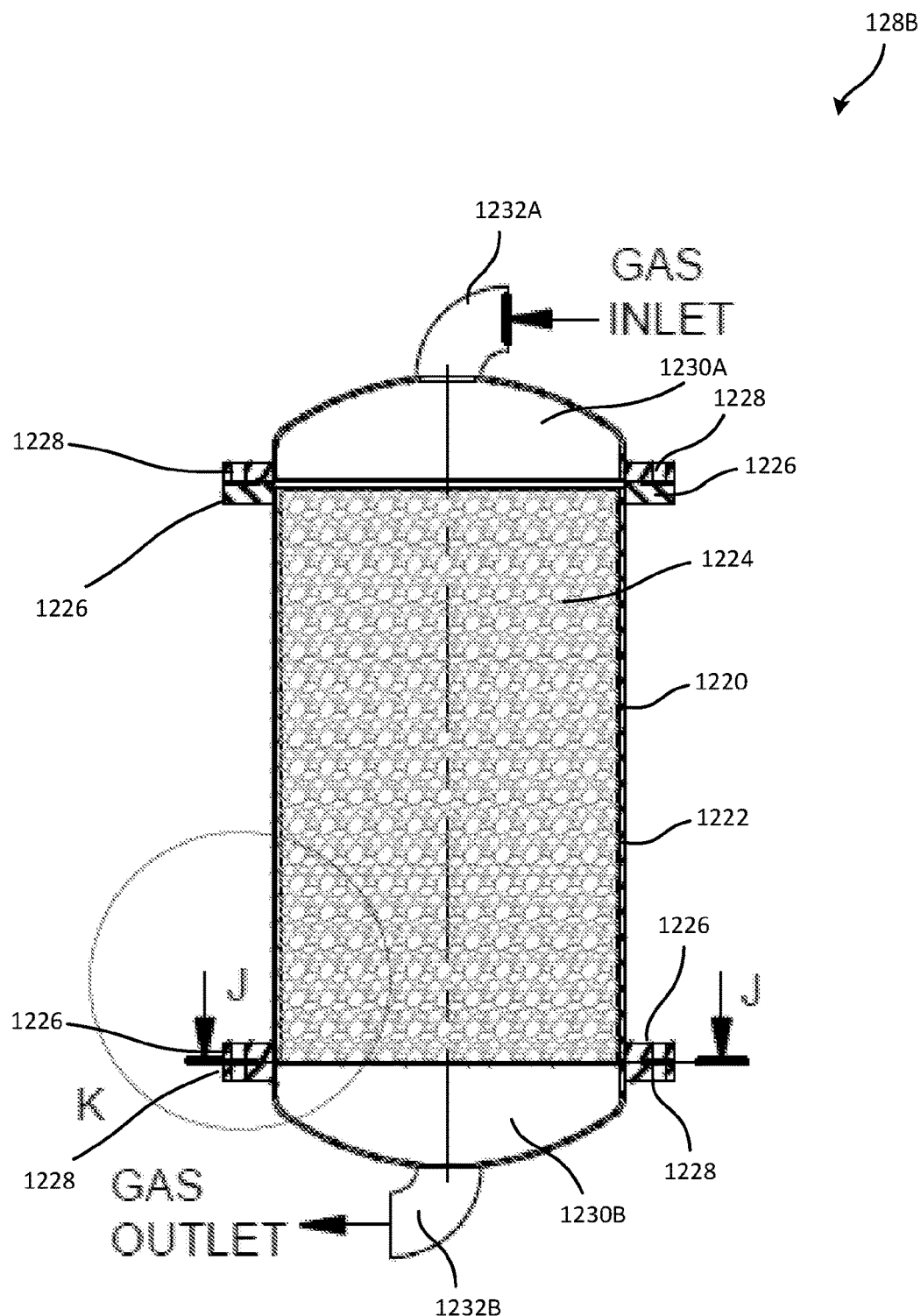
FIG. 12A is a front view of a non-perforated filter module of the filter assembly for contaminant extraction shown in FIGS. 10A-10D and 11A-11C.
Figure 12B:
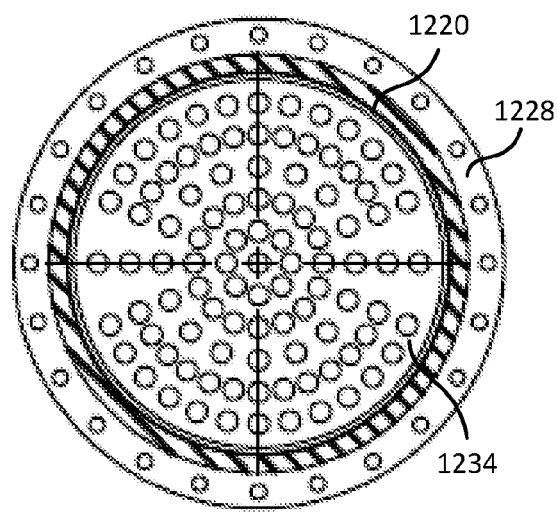
FIG. 12B is a sectioned view taken along J-J of the non-perforated filter module shown in FIG. 12A.
Figure 12C:
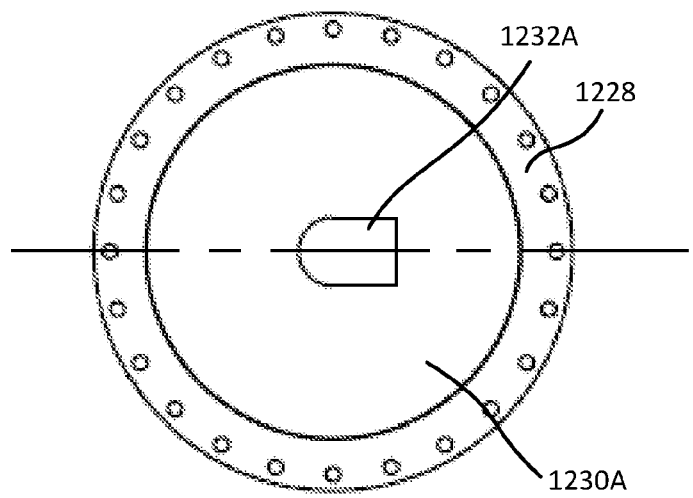
FIG. 12C is a top view of the non-perforated filter module shown in FIGS. 12A-12B.
Figure 12D:
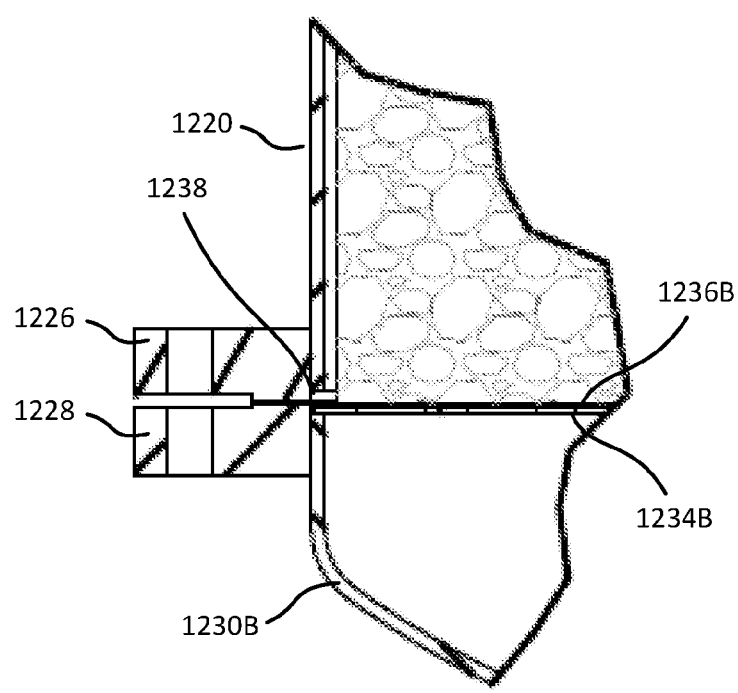
FIG. 12D is an enlarged view of the Inset K shown in FIG. 12A.

As shown in the embodiment of FIG. 12B, the non-perforated filter module 128*b* may comprise a lowermost perforated cover 1234*b* located at the junction between the cylindrical housing 1220 and domed housing 1230*b*. An apertured sheet 1236*b*, for example, a mesh may also be inserted above the lowermost perforated cover 1234*b* and secured in place when flanges 1226, 1228 are fastened together. Additionally, an apertured sheet 1234*a* may also reside below an uppermost perforated cover 1234*a*. The apertured sheets 1234*a*, 1234*b* may assist in keeping the filter media (described below) within the cylindrical chamber 1224 of the non-perforated filter module 128*b*. A gas tight seal 1238 reduces or prevents the escape of gases from between the cylindrical housing 1220 and the domed housings 1230*a*, 1230*b*.

In the example shown in FIG. 12A, the uppermost domed housing 1230*a* receives fluid contaminants from outlet pipe 1215. The fluid contaminants enter the uppermost domed housing 1230*a* and pass through the uppermost perforated cover 1234*a* and apertured sheet 1236*a* into the filter media of the cylindrical chamber 1224. The fluid contaminants from cylindrical chamber 1224 are extracted through the lowermost perforated cover 1234*b* and apertured sheet 1236*b* into the lowermost domed housing 1230*b* and expelled from the gas outlet pipe 1232*b* for further filtering by a downstream filter module or storage.

Filter Bag

Figure 6A:
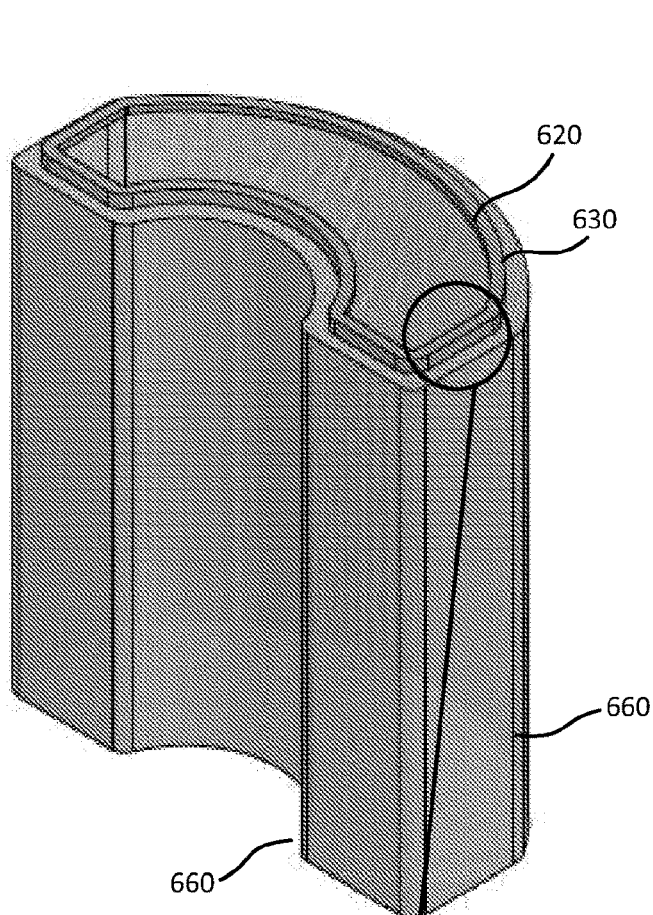
FIG. 6A is a perspective view of a filter bag.

FIG. 6A shows one embodiment of a filter bag 600 for retaining a physical or chemical filter media (described below) and that has been shaped and dimensioned in such a way as to reside within the semi-annular space 310 of a filter module 127*a*, 127*b* or 128*a*, for example, as shown in FIG. 5B.

Figure 6B:
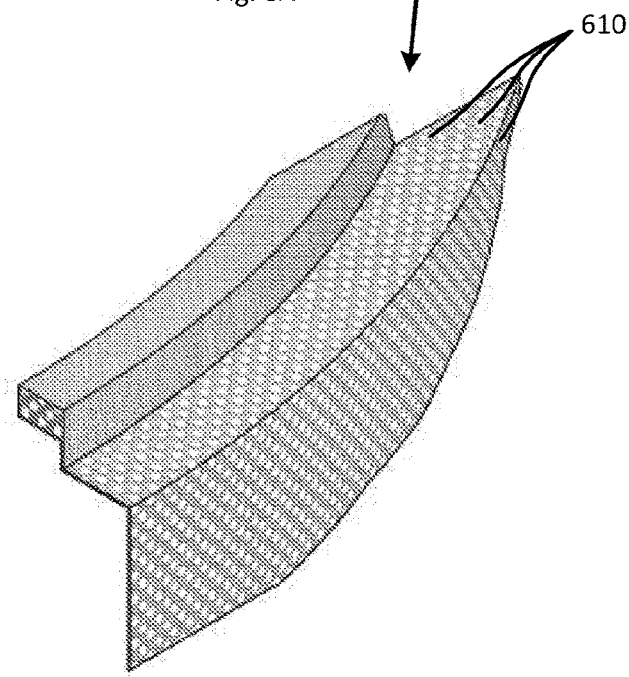
FIG. 6B is an enlarged view of the insert shown in FIG. 6A.

The filter bag 600 comprises a plurality of holes 610 dimensioned to be suitable for retaining the physical or chemical filter media within the bag, as shown in FIG. 6B. In one example, the diameter of the holes 610 are 0.5 mm to 2 mm, preferably 1 mm. Towards the uppermost portion of the filter bag 600 is a protrusion 620 and a flange 630 for engaging the uppermost flange 336 of a filter module, for example, as shown in FIGS. 3C and 5B. In another embodiment, the filter bag 600 is shaped and dimensioned as a cylinder in order to reside within the cylindrical chamber 1224 of filter module 128*b*.

Figure 6C:
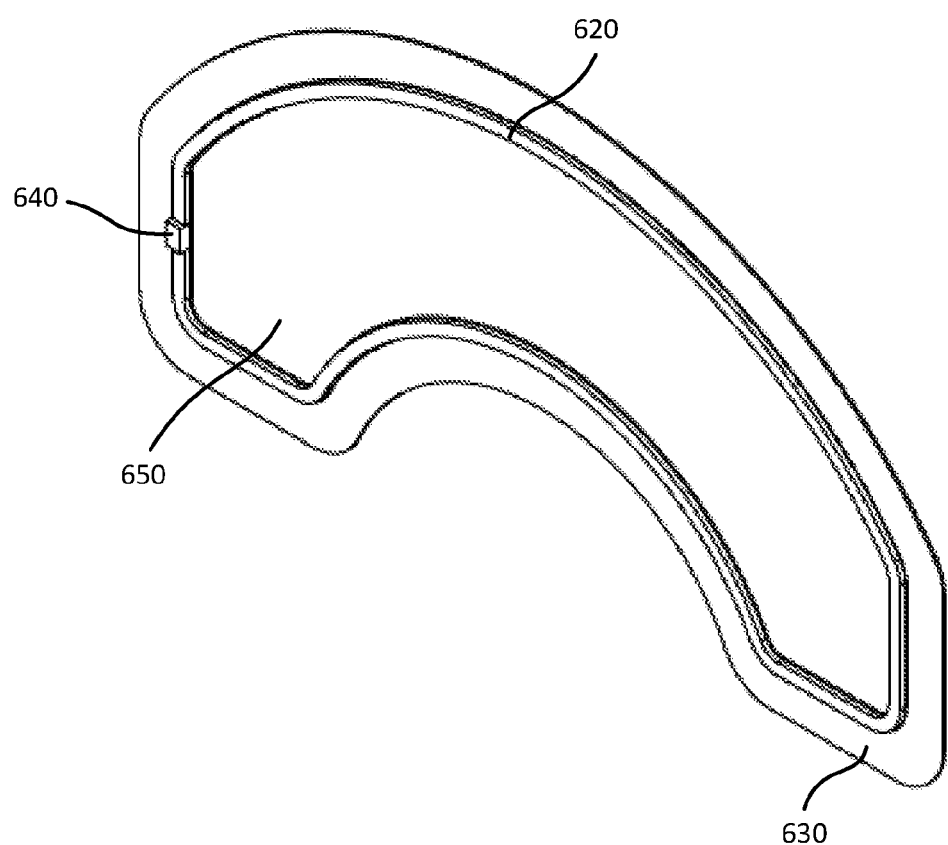
FIG. 6C is a perspective view of the top of the filter bag of FIG. 6A.

In one embodiment, the protrusion 620 may include a zipper 640 connecting a flap 650 to the protrusion 620 of the filter bag 600, as shown in FIGS. 6B and 6C. In another embodiment, the zipper 640 may reside at the same height as the flap 650 of the filter bag 600. When the filter media inside of the filter bag 600 becomes saturated with contaminants, the zipper 640 may be released and the flap 650 opened in order to gain access to the inside of the filter bag 600 for cleaning purposes. The filter bag 600 may contain any filtration media for absorption or filtering of contaminants. In one example, the filter bag may contain a physical filter media, as described below. A frame 660 may also be provided at some of the edges of the filter bag 600 to maintain the annular or cylindrical shape of the filter media during use, as shown in FIG. 6A.

It will be appreciated that the filter bag 600 could be formed from any suitable material for use in a corrosive environment such as a non-woven polyester fabric, woven fiberglass mesh, or metallic mesh coated with corrosion resistance material.

Filter Media

The filter assembly 108 may contain physical and/or chemical filter media for filtering one or more: solid, fluid or gaseous contaminants. The perforated filter modules 127*a*, 127*b* or non-perforated filter modules 128*a*, 128*b* may contain physical and/or chemical filter media depending on the type of contaminants leaking from the production zone 114.

In one example, the perforated filter modules house physical filter media comprising sand or gravel layered in graded order from a lower coarse average particle size of approximately 5-10 mm to an upper relatively fine average particle size of approximately 2-4 mm. In another example, the perforated filter modules house a zeolite such as zeolite clinoptilolite to remove contaminants, for example, ammonium, iron and manganese.

In another example, the non-perforated filter modules house a bed of activated carbon to remove contaminants using chemical absorption. In another example, the non-perforated filter modules house a zeolite such as zeolite clinoptilolite to remove contaminants, for example, ammonium, iron and manganese.

In one embodiment, chemical filter media may also be provided. The type of chemical material used is selected to yield a high specific surface area and favourable absorption properties, such as Iodine absorption.

Funnel

A funnel 113 is provided below the lowermost filter module for channelling contaminant gases and fluids that have escaped from the production zone 114 to the filter assembly 108, as shown in FIGS. 1A-1B, 2 and 7.

In one embodiment, the funnel 113 is bolted or welded to the outer casing 105 prior to the borehole 107 being drilled. Stiffeners 702 are also provided between the lowermost portion of the outer casing 105 and the funnel 113 to reduce the vertical load of the outer casing 105.

Figure 7:
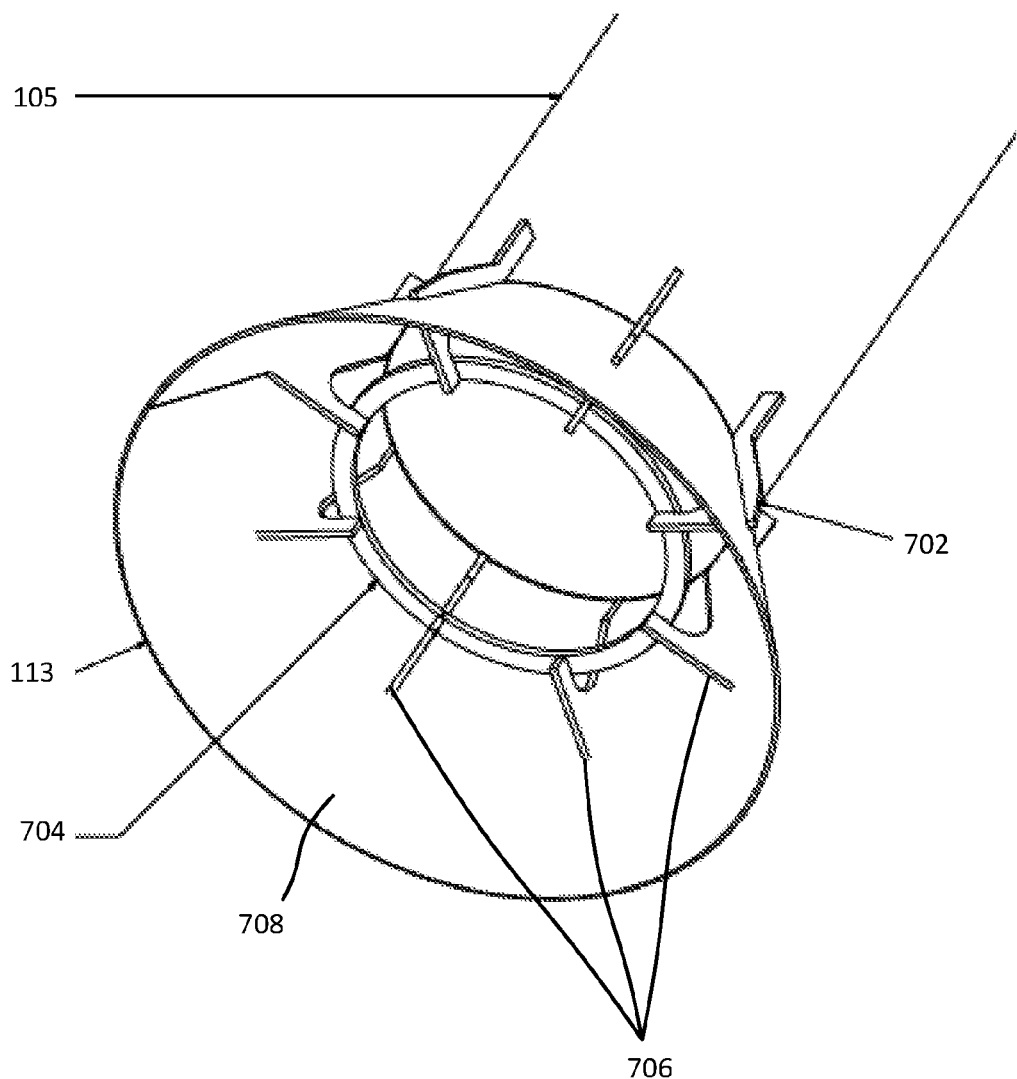
FIG. 7 is a perspective view of a funnel for use in the system of FIG. 1A.

In one embodiment, the funnel 113 is a single component as shown in FIG. 7. In another embodiment, the funnel 113 comprises a plurality of segments that are configured to be collapsed and expanded.

While the funnel 113 is being lowered through the borehole 107 during drilling, the funnel 113 is configured to be in the collapsed (i.e. closed) position. Once a desired location has been reached, the funnel 113 is expanded to an open position where it extends across the annular space between the surrounding rock of the borehole 107 and the outer casing 105.

A supporting ring 704 may also be provided on a plurality of supporting hooks 706 that protrude from the inner surface 708 of the funnel 113 to assist in securing the support cradle 112 or lowermost filter module of the filter assembly 108 within the borehole 107.

Support Cradle

Figure 8A:
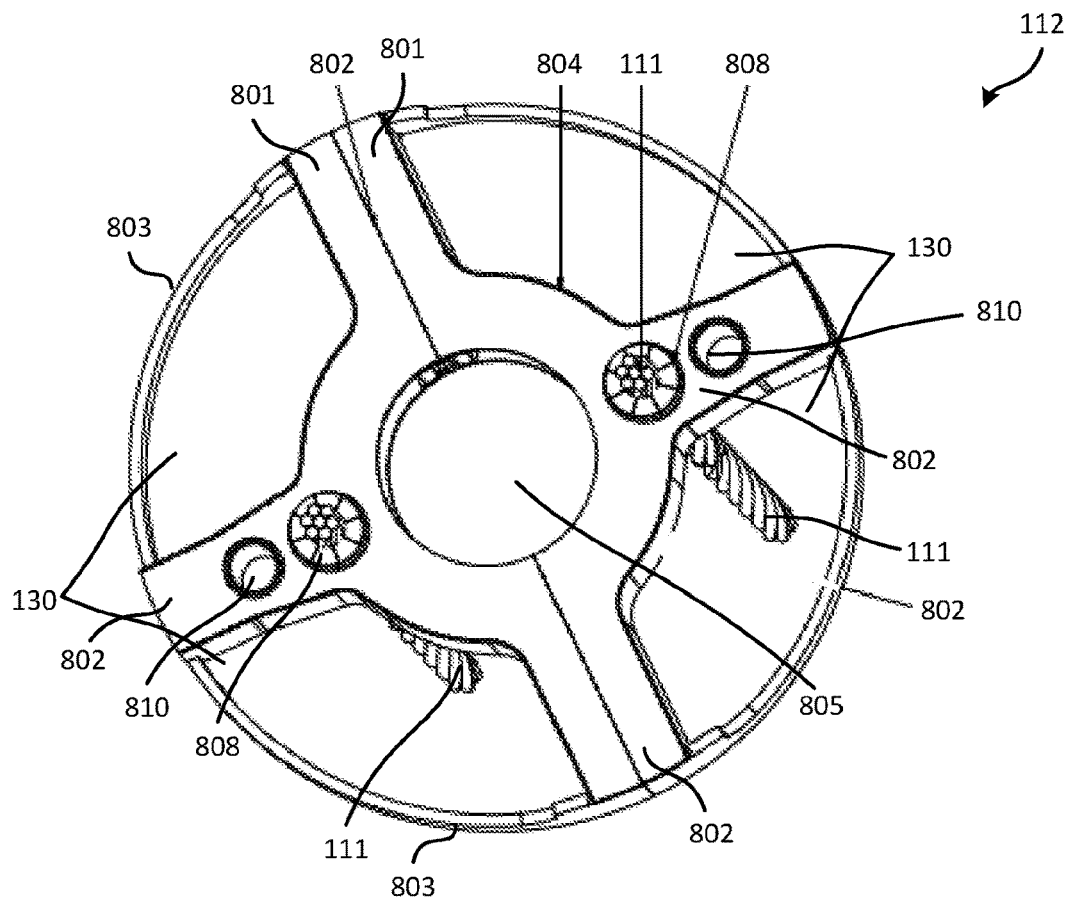
FIG. 8A is a perspective view of a support cradle for use in the system of FIG. 1A.
Figure 8B:
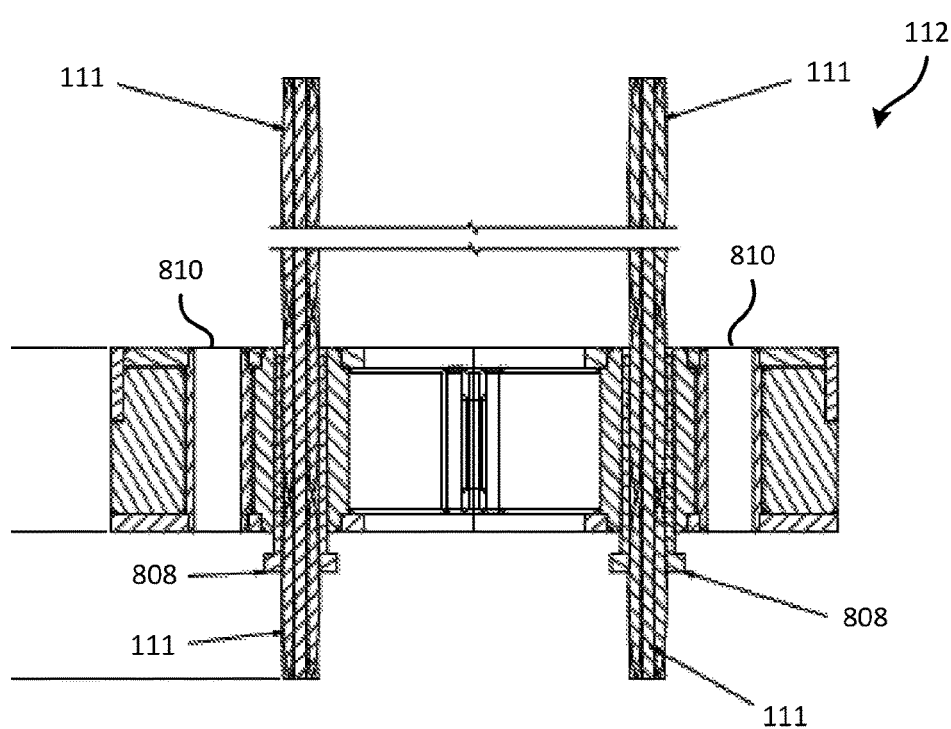
FIG. 8B-8C are cross-sectional views of the support cradle shown in FIG. 8A.
Figure 8C:
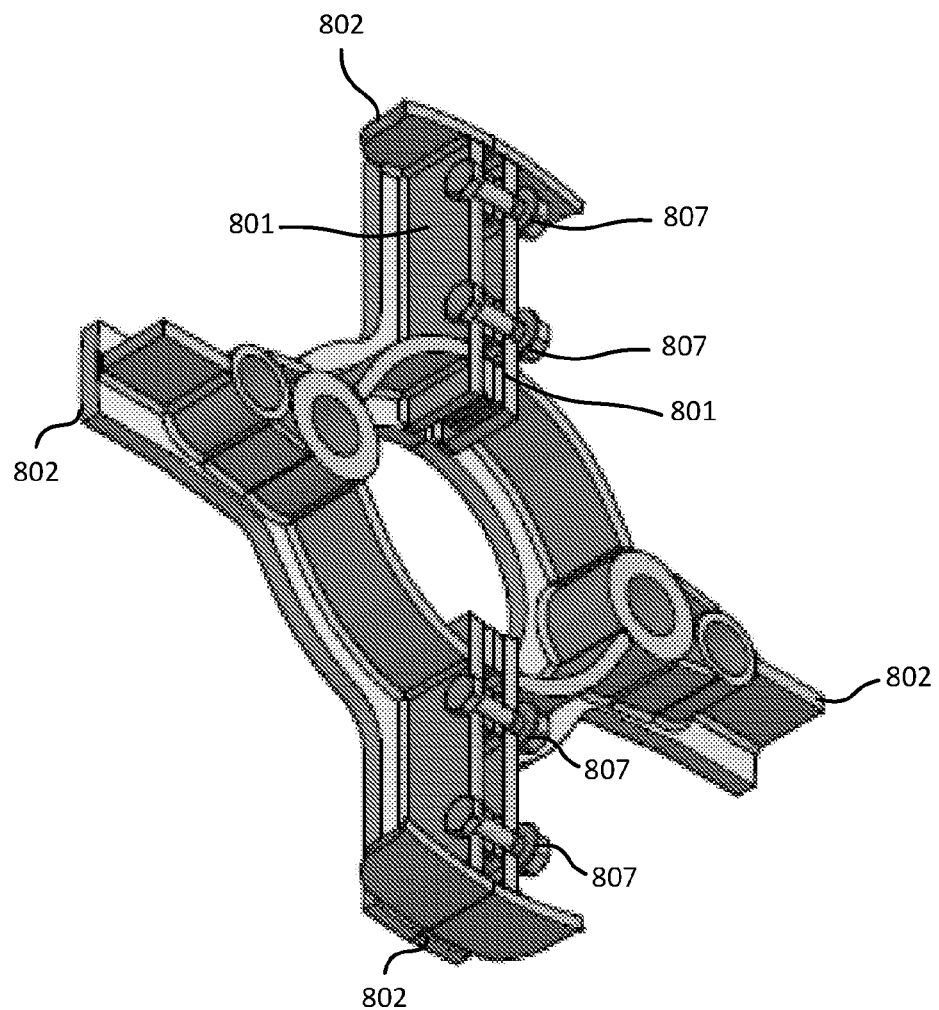

In one embodiment, the support cradle 112 may be used to insert and remove the filter assembly 108 from the borehole 107, as shown in FIGS. 8A-8B.

The support cradle 112 comprises two opposing semi-annular halves 801 that can be clamped together with fasteners 807 to form a supporting frame 802 for supporting the filtering assembly 108 during insertion and removal from the borehole 107. The support cradle is in the form of a central annulus 804 from which four spokes extend 802 to an outer ring 803 to define four openings 130 through which the contaminants pass. The central aperture 805 of the annulus 804 is configured to receive one or more production casings 106 through the borehole 107, and the semi-annular halves permit retrofitting of the support cradle around the production casing, as is the case with the filter modules. An inner pair of apertures 806 in the frame 802 receive the lifting cables 111 and locking shims 808 for anchoring the cables in position. An outer pair of apertures 810 in the frame 802 receive the ends of instrument cables carrying sensors and monitors for detecting and monitoring contaminants in the borehole. In one example, the sensors and monitors will detect when the filter modules and/or filter media become saturated with contaminants and require replacement. Usually, the filter modules and/or filter media will typically require replacement approximately every 8-12 months. This is dependent on the extent of leakage of contaminants from the production zone.

Alignment Roller Devices

A plurality of alignment roller devices 1400 may be provided in the support cradle 112 and/or one or more filter modules 127a, 127b, 128a in order to maintain alignment and prevent snagging of the support cradle 112 and/or filter modules with respect to the outer casing 105 when they are lowered into and raised from the borehole. In one example, four equispaced alignment roller devices are provided in the support cradle 112, in a filter module located towards the middle of the filter assembly and in a filter module located towards the uppermost end of the filter assembly located in the borehole 107. The alignment roller devices may alternatively be fitted to each filter module, for example, on the exterior sidewall 306 and/or solid interior sidewall 308 of each filter module. Three or four equispaced alignment rollers are typically provided.

Figure 14A:
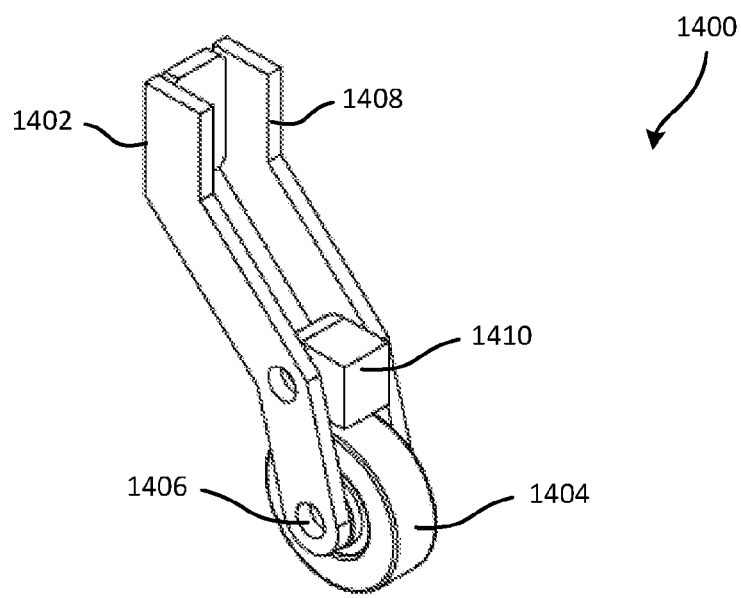
FIG. 14A is a perspective view of one embodiment of an alignment device.
Figure 14B:
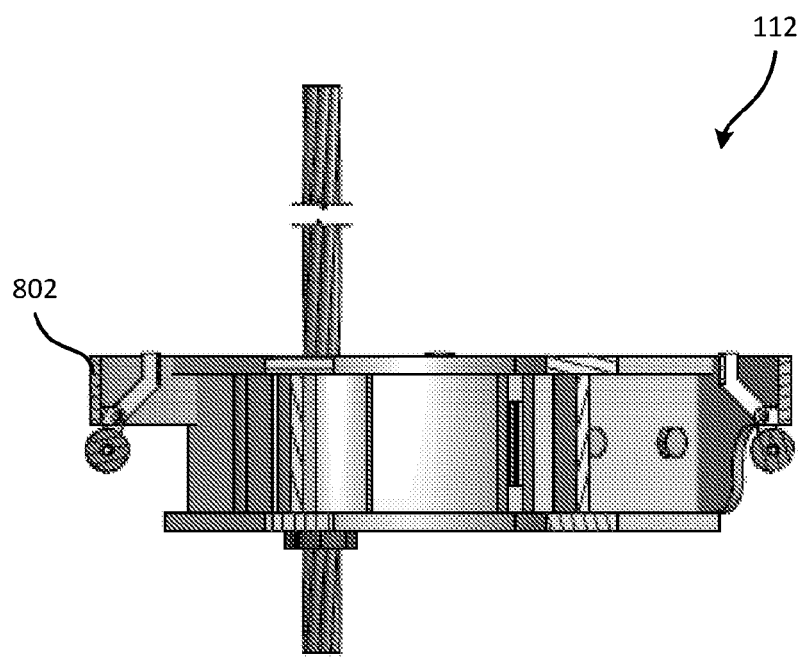
FIG. 14B is a perspective view of the alignment device of FIG. 14A mounted to the support cradle of FIGS. 8A-8B.
Figure 15A:
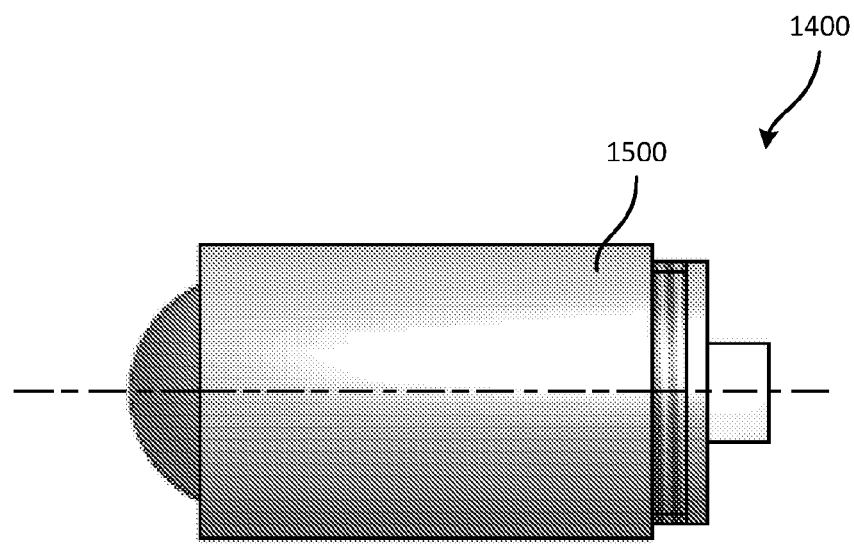
FIG. 15A is a side view of a second embodiment of an alignment device.
Figure 15B:
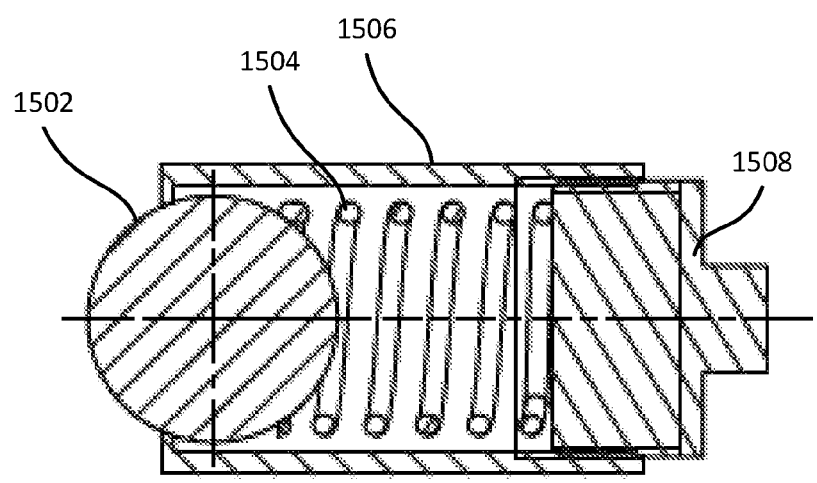
FIG. 15B is a sectioned side view of the alignment device shown in FIG. 15A.
Figure 15C:
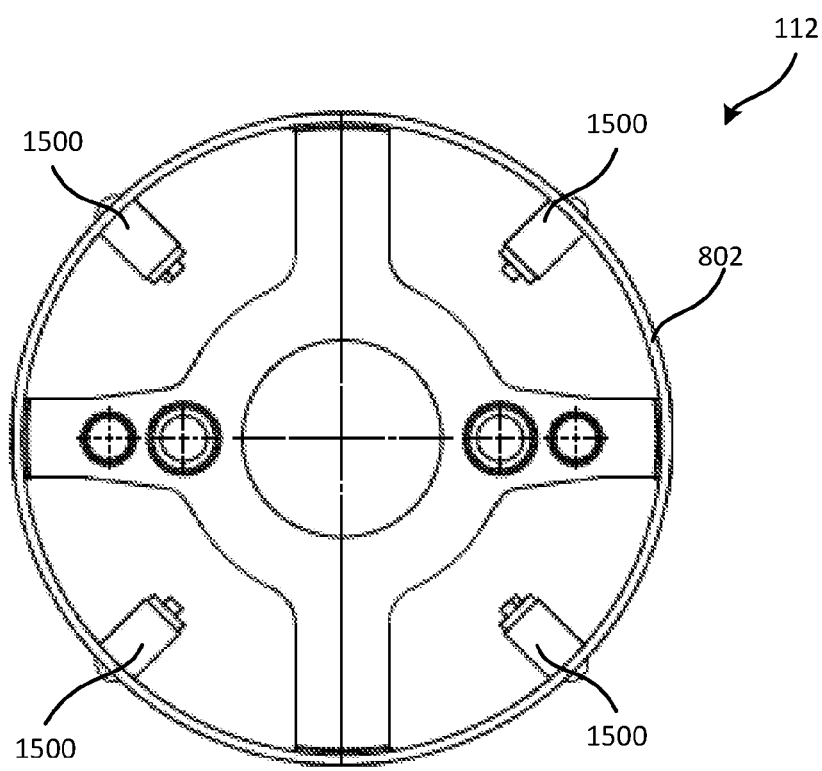
FIGS. 15C-15D illustrate the alignment device of FIGS. 15A-15B mounted to the support cradle of FIGS. 8A-8B.
Figure 15D:
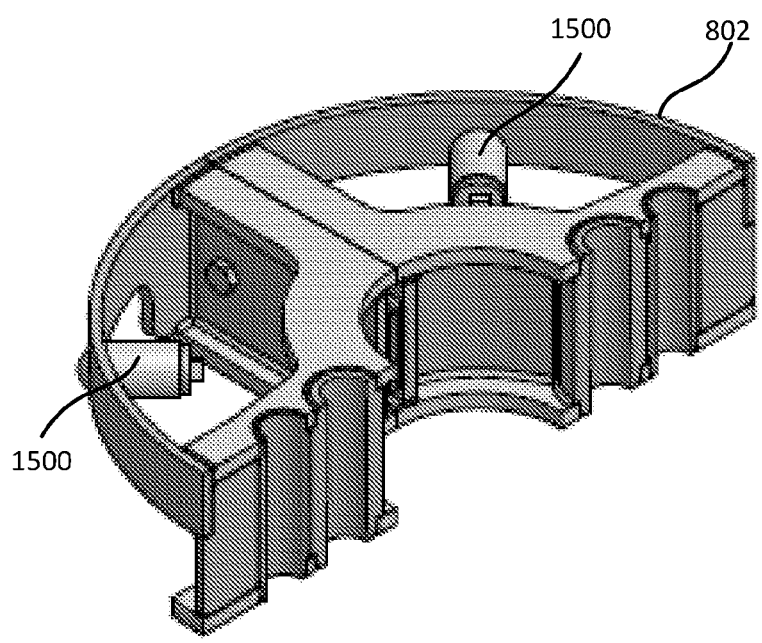
Figure 16A:
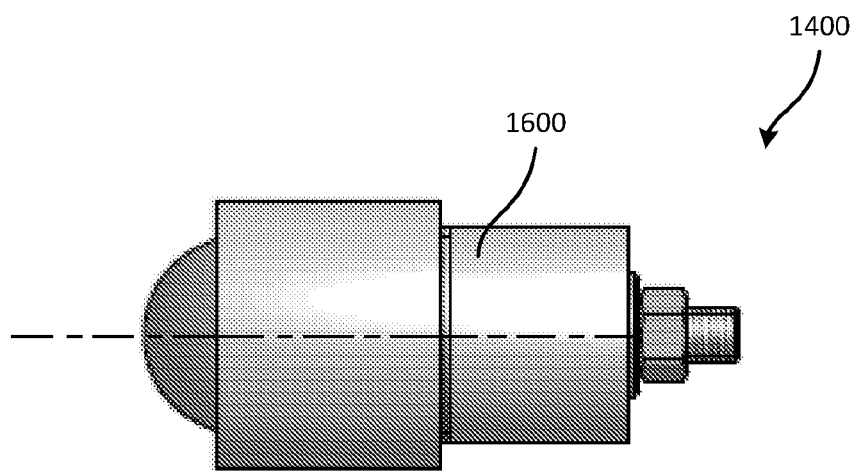
FIG. 16A is a side view of a third embodiment of an alignment device.
Figure 16B:
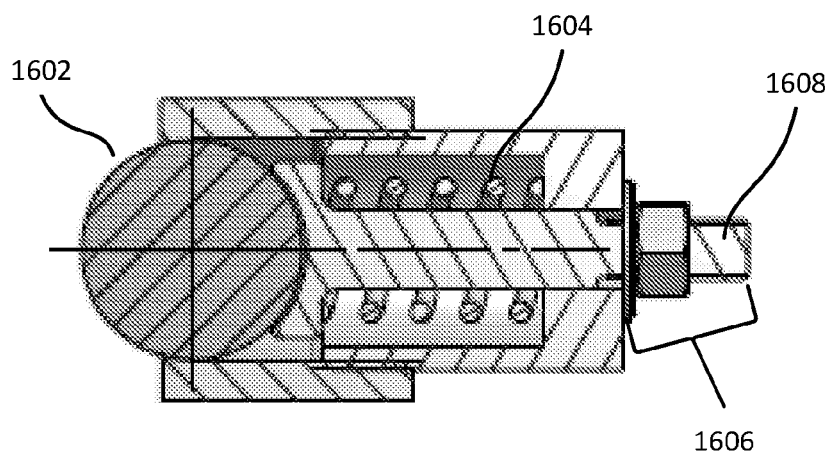
FIG. 16B is a sectioned side view of the alignment device shown in FIG. 16A.
Figure 16C:
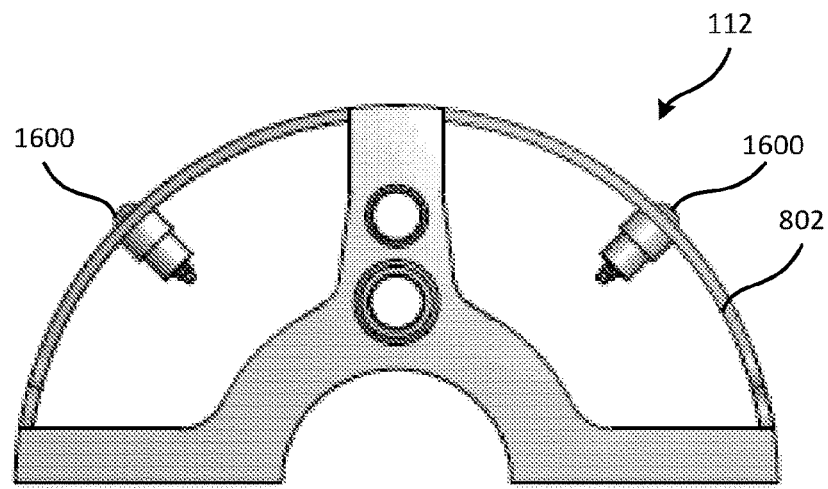
FIGS. 16C-16E illustrate the alignment device of FIGS. 16A-16B mounted to the support cradle of FIGS. 8A-8B.
Figure 16D:
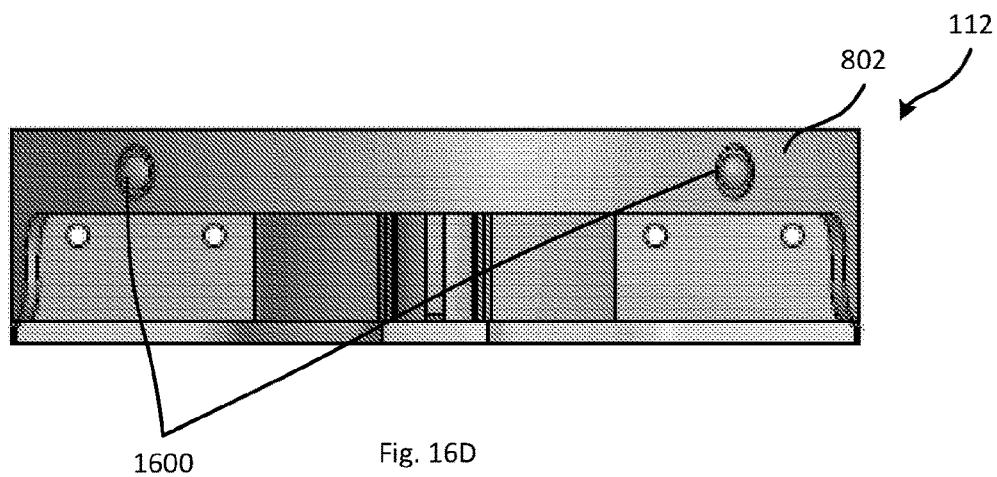
Figure 16E:
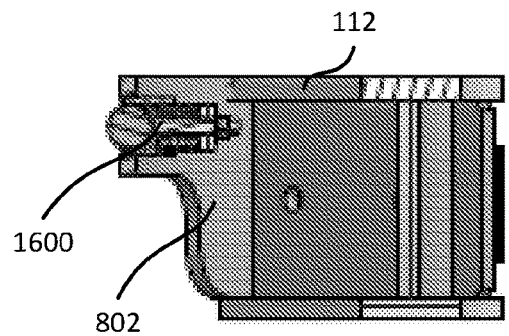

In one embodiment shown in FIG. 14A, alignment devices 1400 are in the form of caster wheels 1402 comprising a wheel 1404 on an axle 1406 that is mounted to a bracket 1408. The caster wheel 1402 may be outwardly biased, and has a mounting plate 1410 for mounting the caster wheel to the supporting frame 802 of the support cradle 112 as shown in FIG. 14B.

In another embodiment the alignment roller devices 1400 may be spring loaded devices as shown by example in FIGS. 15A-15D and 16A-16E. FIGS. 15A-15D show a first embodiment of a spring loaded device 1500 mounted to supporting frame 802 of support cradle 112. The spring loaded device 1500 comprises a ball 1502 and spring 1504 arrangement located within housing 1506. An adjustable cap is provided at one end of the spring 1504 opposite ball 1502 to provide an appropriate amount of tension on spring 1504. FIGS. 16A-16D show a second embodiment of a spring loaded device 1600 mounted to supporting frame 802 of support cradle 112. The spring loaded device 1600 comprises a ball 1602 and spring 1604 arrangement located within housing 1606. A rod 1608 extends through spring 1604 and engages ball 1602. Rod 1608 is fastened to housing 1606 by a washer and bolt arrangement to provide an appropriate amount of tension on spring 1504 to adjust the extent of outward biasing or the rotary ball.

Method for Contaminant Extraction in Borehole

The systems 100, 1200, 1300 for contaminant extraction in a borehole 107 may be used in areas where water, steam or other liquids (such as petroleum) or natural gases (Coal Seam Gas or shale gas) are extracted.

Figure 9:
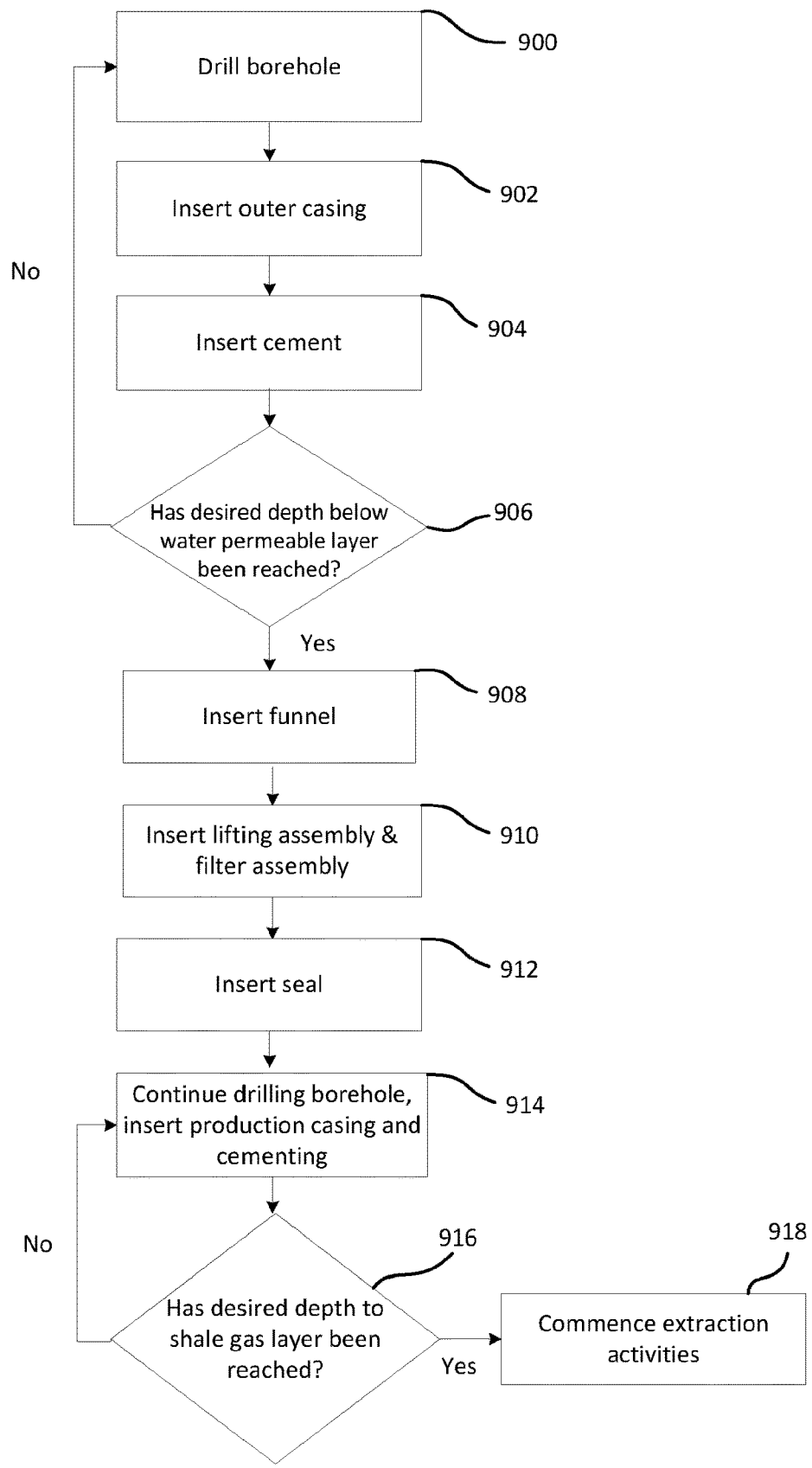
FIG. 9 is a flowchart of a method of operation of the system shown in FIG. 1A.

The operation of the system 100 for contaminant extraction in a borehole 107 within an underground formation 150 will now be described with reference to FIG. 9. As mentioned above for FIG. 1A, the underground formation 150 includes a production zone 114 and an overlying water permeable layer 102. It will be appreciated that some of these steps may be performed in a different sequence without departing from the general concept of the present disclosure.

At step 900, a borehole 107 is drilled from the surface 101 to a desired depth below a water permeable layer 102. In one example, the borehole 107 may be drilled to an initial depth just below the water permeable layer 102. At steps 902-904, an outer casing 105 is inserted through the borehole 107 and cemented in place. It will be appreciated that drilling of the borehole 107 and insertion of the outer casing 105 may be completed together, for example, using Casing-while-Drilling techniques or separately.

It will also be appreciated that a borehole 107 is drilled at a greater diameter than the outer casing 105. In one example, a borehole 107 is drilled with a diameter of approximately 1.5 meters or less and an outer casing 105 having a diameter of approximately 1 meter or less is used.

Once the desired depth below the water permeable layer 102 has been reached at step 906, the funnel 113, in a collapsed configuration (i.e. closed position), may be lowered into the borehole 107 to the in-use location where it engages the lowermost end of the outer casing 105 and is expanded to an open position to encompass the drilled diameter of the borehole 107, for example, 1.5 meters (see step 908). Additional rock may be reamed away to accommodate the funnel.

In another embodiment, the collapsed funnel 113 may also be attached to the lowermost end of the outer casing 105 before the outer casing 105 is inserted into the borehole 107 so that both the outer casing 105 and funnel 113 are inserted through the borehole 107 together. In one example, the funnel 113 is located at the transition between the water permeable layer 102 and an underlying impermeable layer. In another example, the funnel 113 is located approximately 5 meters below the transition between the water permeable layer 102 and the underlying impermeable layer.

At the surface 101, the pair of cables 111 is inserted into the inner pair of apertures 806 of the support cradle 112 and is anchored into position by the locking shims 808. Two opposing semi-annular housings 304 of the perforated filter module 127a are positioned above the support cradle 112 and mounted together around the pair of cables 111 to form the perforated filter module 127a. The support cradle 112 and perforated filter module 127a are then lowered into the intermediate zone 110 just below the surface 101 by the surface-based winding assembly. This allows subsequent overlying perforated filter modules 127a and/or non-perforated filter modules 128a to be mounted around the pair of cables 111 at the surface 101 and engaged with the underlying perforated filter module 127a in a stacked configuration.

Once the desired number of perforated 127a and non-perforated filter modules 128a forming the filter assembly 108 have been lowered into the intermediate zone 110, a seal 122 is connected around the pair of cables 111 at the surface 101 in contact with the uppermost filter module of the filtering assembly 108 (see step 912). In one embodiment, the seal 122 may be a hydraulic or pneumatic seal. In another embodiment, the seal 122 is configured to be in collapsed state when it is lowered or raised through the borehole 107 and configured to be expandable when it has reached a desired depth in the borehole 107. It may also be desirable for a space to exist between the seal 122 and the surface 101 to allow for filtered gases to escape the filtering assembly 108 and enter into the collection zone 124 for collection and further processing.

Once the seal 122 has been positioned in the intermediate zone 110, the seal 122, the filter assembly 108 and the support cradle 112 are lowered through the intermediate zone 110 until the support cradle 112 engages the supporting hooks 706 of the funnel 113 so that the filter assembly 108 extends upwardly from just below the water permeable layer 102. Inserting the filter assembly 108 into the borehole 107 before the production casing 106 is inserted may ensure that the filter assembly 108 captures any contaminants that arise during construction of the wellbore.

In another embodiment, a support cradle 112 is not required as each filter module 127a, 127b, 128a is independently and directly coupled to the plurality of cables 111 extending through the borehole 107. In another embodiment, the plurality of channels 302 of each filter module 127a, 127b, 128a are configured to grip onto each respective cable 111 along its length. It will be appreciated that having the filter modules 127a, 127b, 128a independently and directly coupled to the cables 111 means that in the instance that a filter module 127a, 127b, 128a fails, the underlying filter module 127a, 127b, 128a may be able to support the weight of the overlying failed filter module 127a, 127b, 128a.

In the case of an embodiment where the gas filtering modules are located externally of the borehole, a removable sealing cap 1216 may also be connected to the uppermost portion of the outer casing 105 at or near the surface and is provided with a plurality of apertures for receiving the cables 111, production casing 106 and outlet pipe 1214.

At steps 914-916, drilling of the borehole 107 then continues until a desired depth to the production zone 114 has been reached. Production casing 106 is then inserted through the central channel 302a of the plurality of filter modules 127a, 127b, 128a, and the central annulus 804 of the support cradle 112 so that the production casing 106 extends from the production zone 114 to the surface 101, allowing extraction activities to commence at step 918. The portion of the production casing 106 inserted below the filter assembly 108 may also be cemented to the surrounding rock wall of the borehole 107. A person skilled in the art will appreciate that this production casing 106 may be inserted at the same time or separately to drilling of the borehole 107. The borehole 107 and production casing 106 may also change direction from being substantially vertical to substantially horizontal as the borehole 106 approaches the production zone 114.

In one embodiment, the production casing 106 is inserted at the same time as drilling of the borehole 107 and insertion of the outer casing 105. At the surface 101, the pair of cables 111 is inserted into the inner pair of apertures 806 of each of the opposing semi-annular halves 801 of the support cradle 112 and are anchored into position by the locking shims 808. The two opposing semi-annular halves 801 of the support cradle 112 are then fastened together around the production casing 106. Two opposing semi-annular housings 304 of the perforated filter module 127a are positioned above the support cradle 112 and mounted together around the pair of cables 111 to form the perforated filter module 127a. The support cradle 112 and perforated filter module 127a are then lowered into the intermediate zone 110 just below the surface 101 by the surface-based winding assembly. This allows subsequent overlying perforated filter modules 127a and/or non-perforated filter modules 128a to be mounted around the pair of cables 111 at the surface 101 and engaged with the underlying perforated filter module 127a in a stacked configuration. Once the desired number of perforated 127a and non-perforated filter modules 128a forming the filter assembly 108 have been lowered into the intermediate zone 110, a seal 122 is connected around the pair of cables 111 at the surface 101 in contact with the uppermost filter module of the filtering assembly 108. Once the seal 122 has been positioned in the intermediate zone 110, the seal 122, the filter assembly 108 and the support cradle 112 are lowered through the intermediate zone 110 until the support cradle 112 engages the supporting hooks 706 of the funnel 113 so that the filter assembly 108 extends upwardly from just below the water permeable layer 102.

Figure 13:
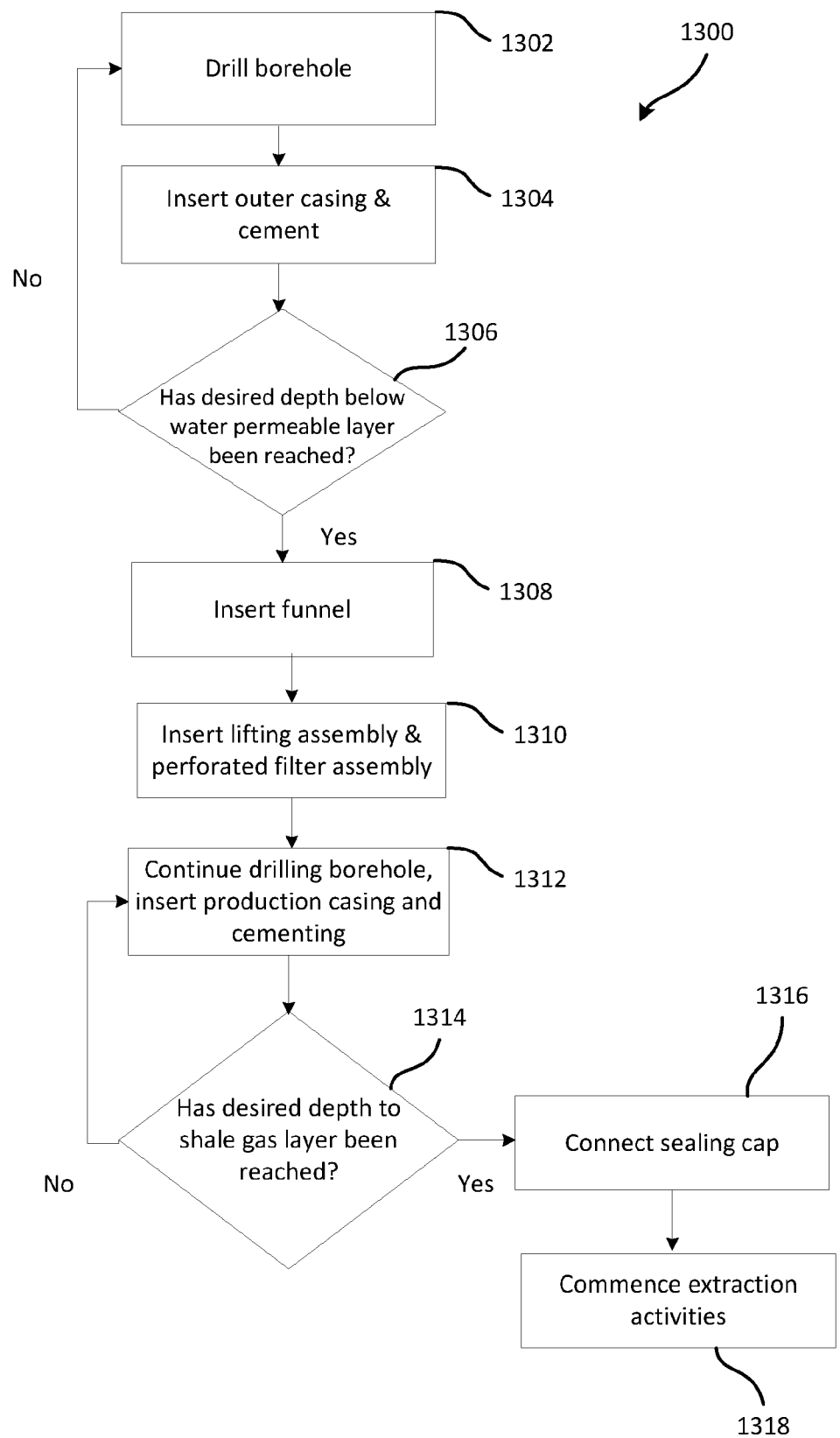
FIG. 13 is a flowchart of a method of operation of the system shown in FIGS. 10A and 11A.

The operation of systems 1200, 1300 for contaminant extraction in a borehole 107 within an underground formation 150 will now be described with reference to FIG. 13.

At step 1302, a borehole 107 is drilled from the surface 101 to a desired depth below a water permeable layer 102. In one example, the borehole 107 may be drilled to an initial depth just below the water permeable layer 102. At steps 1304, an outer casing 105 is inserted through the borehole 107 and cemented in place.

Once the desired depth below the water permeable layer 102 has been reached at step 1306, the funnel 113, in a collapsed configuration (i.e. closed position), may be lowered into the borehole 107 to the in-use location where it engages the lowermost end of the outer casing 105 and is expanded to an open position to encompass the drilled diameter of the borehole 107, for example, 1.5 meters (see step 1308).

At the surface 101, the pair of cables 111 is inserted into the inner pair of apertures 806 of the support cradle 112 and are anchored into position by the locking shims 808. Two opposing semi-annular housings 304 of the perforated filter module 127a are positioned above the support cradle 112 and mounted together around the pair of cables 111 to form the perforated filter module 127a. The support cradle 112 and perforated filter module 127a are then lowered into the intermediate zone 110 just below the surface 101 by the surface-based winding assembly. This allows subsequent overlying perforated filter modules 127a and/or 127b to be mounted around the pair of cables 111 at the surface 101 and engaged with the underlying perforated filter module 127a.

Once the desired number of perforated filter modules 127a and/or 127b have been positioned in the intermediate zone 110, the perforated filter modules 127a and/or 127b and the support cradle 112 are lowered through the intermediate zone 110 until the support cradle 112 engages the supporting hooks 706 of the funnel 113 so that the filter assembly 108 extends upwardly from just below the water permeable layer 102 (see step 1310).

At steps 1312-1314, drilling of the borehole 107 then continues until a desired depth to the production zone 114 has been reached. Production casing 106 is then inserted through the central channel 302a of the plurality of filter modules 127a, 127b and the central annulus 804 of the support cradle 112 so that the production casing 106 extends from the production zone 114 to the surface 101.

In embodiments including a separate filter module outside the borehole, a removable sealing cap 1216 is sealingly connected to the uppermost portion of the outer casing 105 and is provided with a plurality of apertures for receiving the cables 111, production casing 106 and outlet pipe 1214 (see step 1316). Outlet pipe 1214 is connected to the sealing cap 1216 for receiving contaminant gases and/or fluids from the intermediate zone 110. Outlet pipe 1214 is then connected to an inlet pipe of a first non-perforated filter module 128b of a series of non-perforated filter modules that are located externally of the borehole 107. Extraction activities can then commence at step 1318.

The operation of the system 100 to filter or reduce contamination will now be described with reference to FIG. 1B. During hydrocarbon extraction, geothermal well operation or fracking activities some contaminants such as fracking fluids, methane gas or carbon dioxide gas may leak from the production zone and migrate upwards around the borehole. The flow of these contaminants may occur between the production casing 106 and outer casing 105 or the outer casing 105 and the cement 120 or the cement 120 and the surrounding borehole 107. It will be appreciated that contaminants may be released and continue to migrate upwards along the production casing 106 after the hydrocarbon extraction, geothermal or fracking activities have ceased.

In some circumstances these leaks may be due to poor sealing between the outer casing 105 and the surrounding rock wall of the borehole 107. In other circumstances this may be due to deterioration or failure of the outer casing 105, the cement 120 or production casing 106 over time or due to the natural movements of the strata surrounding the borehole 107. Alternatively, strata around the outer casing 105 may be fractured or permeable thereby creating a path for leaking gas.

Some exemplary pathways of contaminant fluids and gas are shown by reference numerals 1000 and 1100 in FIG. 1B. The funnel 113 channels these rising contaminants through the plurality of apertures 130 of the support cradle 112 and into the filter assembly 108.

One pathway is shown by reference numeral 1000 which shows the rising fluids and gases travelling along the production casing 106, through the funnel 113 and the apertures 130 in the support cradle 112 and into a lowermost perforated filter module 127a or 127b of the filtering assembly 108.

In the embodiment shown in FIG. 1B, the lowermost perforated filter module is the first embodiment of the perforated filter module shown in FIGS. 3B-3C comprising a plurality of apertures 131a and housing physical or chemical filter media. As mentioned previously, the plurality of apertures 131a permit the contaminant fluids and/or gas to enter the perforated filter modules so that they can be filtered by the physical or chemical filter media. In some instances, gases may escape from the plurality of apertures 131a of the perforated filter module 127a and rise upwards through the intermediate zone 110 between the filter assembly 108 and the outer casing 105, as shown by path 1100. The seal 122 results in an increase in pressure within the intermediate zone 110 and causes the escaped gases and/or fluids to be directed downwards towards the perforated filter modules 127a (see path 1100). In one embodiment, these gases and/or fluids may once again enter the perforated filter modules 127a and migrate upwards through the remaining perforated filter modules 127a (if any) and the one or more non-perforated filter modules 128a to form a purified gas and/or fluid that will ultimately be transmitted through one or more openings 142 of the seal 122 and into the overlying collection zone 124. In another embodiment, the gases and/or fluids transmitted through the perforated filter modules 127a and/or 127b migrate upwards through the intermediate zone 110 towards the surface 101. The gases and/or fluids may then be collected for further filtering by a series of non-perforated filter modules 128b located externally of the borehole.

When sensors (not shown) indicate that the filter modules are saturated and require replacement, every 8-12 months or so, a maintenance cycle commences during which operations cease. The sealing cap is removed and the modules are raised on the cables using the winding assembly, and replaced with fresh filter modules, with the module halves being fitted around the production pipe and cables in the manner previously described and lowered into position, after which the sealing cap is replaced and sealed in position, including sealing of the cable interface.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A system for contaminant extraction in a borehole extending from a surface of the Earth through a water permeable layer and into an underlying production zone, the system comprising:
   an outer casing located within the borehole and extending through the water permeable layer;
   a production pipe located within the outer casing and extending towards the production zone;
   a filter assembly, at least part of which occupies at least part of an intermediate zone between the outer casing and the production pipe, wherein the filter assembly is configured to capture contaminants before they enter the water permeable layer and/or before they are released into the atmosphere, the filter assembly comprising:
   a lower filtering stage configured to filter solid and liquid contaminants; and an upper filtering stage located externally of the borehole and configured to filter gaseous contaminants migrating from the production zone through the lower filtering stage;

wherein the intermediate zone is sealed off to prevent the uncontrolled leakage of gaseous contaminants from the intermediate zone, and the upper filtering stage is in fluid communication with the sealed off intermediate zone; and wherein the lower filtering stage comprises a perforated housing arrangement and the upper filtering stage comprises a non-perforated housing arrangement, the perforated housing arrangement comprising one or more perforated filter modules configured to filter solid and liquid contaminants and permit entry of gaseous contaminants migrating from the production zone into the upper filtering stage of the filter assembly.

2. The system according to claim 1, in which each non-perforated filter module includes chemical or physical filter media selected from a group including zeolite and activated carbon.

3. The system according to claim 1, in which at least one perforated filter module includes a physical filter medium including zeolite.

4. The system according to claim 1, in which the lower filtering stage includes a plurality of alignment rollers configured to bear rotatably against the outer casing for facilitating raising and lowering of the lower filtering stage within the borehole.

5. The system according to claim 1, wherein a filter bag is provided within the one or more perforated modules for containing physical and/or chemical filter media.

6. The system according to claim 1, wherein gaseous contaminants are selected from the group including: hydrogen sulphide, methyl mercaptan, methane gas, carbon dioxide gas and heavy elements leaking from the production zone.

7. A system for contaminant extraction in a borehole extending from a surface of the Earth through a water permeable layer and into an underlying production zone, the system comprising:
an outer casing located within the borehole and extending through the water permeable layer;
a production pipe located within the outer casing and extending towards the production zone;
a filter assembly, at least part of which occupies at least part of an intermediate zone between the outer casing and the production pipe, wherein the filter assembly is configured to capture contaminants before they enter the water permeable layer and/or before they are released into the atmosphere, the filter assembly comprising:
a lower filtering stage configured to filter solid and liquid contaminants; and
an upper filtering stage located externally of the borehole and configured to filter gaseous contaminants migrating from the production zone through the lower filtering stage;
wherein the intermediate zone is sealed off to prevent the uncontrolled leakage of gaseous contaminants from the intermediate zone and the upper filtering stage is in fluid communication with the sealed off intermediate zone; and
wherein the upper filtering stage comprises a plurality of serially connected replaceable non-perforated filter modules located in an underground or below ground pit adjacent to the borehole.

8. The system according to claim 7, wherein the non-perforated filter modules comprise a cylindrical housing having a solid exterior sidewall defining an inner cylindrical chamber for the insertion of filter media.

9. The system according to claim 8, wherein an inlet pipe is connected to the uppermost portion of the housing for receiving gaseous contaminants and an outlet pipe is connected to a lowermost portion of the housing to transmit filtered gaseous contaminants to at least one adjacent downstream non-perforated filter module for further filtering.

10. The system according to claim 9, wherein upper and lower perforated covers are provided for retaining the filter media within the cylindrical housing.

11. The system according to claim 10, wherein an uppermost flange and a lowermost flange extend from respective ends of the cylindrical housing for connecting to a flange of an uppermost domed housing and a lowermost domed housing, respectively, the perforated covers being retained between the flanges.

12. A system for contaminant extraction in a borehole extending from a surface of the Earth through a water permeable layer and into an underlying production zone, the system comprising:
an outer casing located within the borehole and extending through the water permeable layer;
a production pipe located within the outer casing and extending towards the production zone;
a filter assembly, at least part of which occupies at least part of an intermediate zone between the outer casing and the production pipe, wherein the filter assembly is configured to capture contaminants before they enter the water permeable layer and/or before they are released into the atmosphere, the filter assembly comprising:
a lower filtering stage configured to filter solid and liquid contaminants; and
an upper filtering stage located externally of the borehole and configured to filter gaseous contaminants migrating from the production zone through the lower filtering stage;
wherein the intermediate zone is sealed off to prevent the uncontrolled leakage of gaseous contaminants from the intermediate zone, and the upper filtering stage is in fluid communication with the sealed off intermediate zone; and
wherein the lower filtering stage includes a plurality of alignment rollers configured to bear rotatably against the outer casing for facilitating raising and lowering of the lower filtering stage within the borehole.

13. The system according to claim 12, wherein the upper filtering stage comprises a plurality of serially connected replaceable non-perforated filter modules located in an underground or below ground pit adjacent to the borehole.

14. The system according to claim 13, wherein the non-perforated filter modules comprise a cylindrical housing having a solid exterior sidewall defining an inner cylindrical chamber for the insertion of filter media.

15. The system according to claim 14, wherein an inlet pipe is connected to the uppermost portion of the housing for receiving gaseous contaminants and an outlet pipe is connected to a lowermost portion of the housing to transmit filtered gaseous contaminants to at least one adjacent downstream non-perforated filter module for further filtering.

16. The system according to claim 15, wherein upper and lower perforated covers are provided for retaining the filter media within the cylindrical housing.

17. The system according to claim 16, wherein an uppermost flange and a lowermost flange extend from respective ends of the cylindrical housing for connecting to a flange of an uppermost domed housing and a lowermost domed housing, respectively, the perforated covers being retained between the flanges.

18. The system according to claim 12, wherein gaseous contaminants are selected from the group including: hydrogen sulphide, methyl mercaptan, methane gas, carbon dioxide gas and heavy elements leaking from the production zone.

19. The system according to claim 12, wherein a filter bag is provided within the one or more perforated modules for containing physical and/or chemical filter media.

\* \* \* \* \*